(12) United States Patent
Thesling

(10) Patent No.: US 8,077,652 B2
(45) Date of Patent: Dec. 13, 2011

(54) MF-TDMA FREQUENCY HOPPING

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 709 days.

(21) Appl. No.: 12/174,676

(22) Filed: Jul. 17, 2008

(65) Prior Publication Data

US 2009/0016260 A1 Jan. 15, 2009

Related U.S. Application Data

(63) Continuation of application No. PCT/US2007/079541, filed on Sep. 26, 2007.

(60) Provisional application No. 60/827,999, filed on Oct. 3, 2006, provisional application No. 60/827,994, filed on Oct. 3, 2006.

(51) Int. Cl.
*H04B 7/185* (2006.01)

(52) U.S. Cl. .................. 370/316; 455/11.1; 375/132

(58) Field of Classification Search .................. None
See application file for complete search history.

(56) References Cited

U.S. PATENT DOCUMENTS

| | | | |
|---|---|---|---|
| 5,329,548 A * | 7/1994 | Borg | 375/135 |
| 5,638,399 A | 6/1997 | Schuchman et al. | |
| 5,699,355 A | 12/1997 | Natarajan | |
| 5,898,681 A | 4/1999 | Dutta | |
| 5,943,324 A * | 8/1999 | Ramesh et al. | 370/321 |
| 5,959,984 A * | 9/1999 | Dent | 370/347 |
| 6,112,094 A | 8/2000 | Dent | |
| 6,487,183 B1 | 11/2002 | Lo et al. | |
| 6,511,020 B2 | 1/2003 | Higgins | |
| 6,735,188 B1 | 5/2004 | Becker et al. | |
| 6,788,729 B1 * | 9/2004 | Posti | 375/133 |
| 6,842,437 B1 | 1/2005 | Heath | |
| 6,847,626 B1 | 1/2005 | Carneal et al. | |
| 6,865,609 B1 | 3/2005 | Gubbi et al. | |
| 6,937,580 B2 | 8/2005 | Heatwole et al. | |
| 6,985,725 B2 | 1/2006 | Berger | |

(Continued)

FOREIGN PATENT DOCUMENTS

CN 101573893 A 11/2009

(Continued)

OTHER PUBLICATIONS

Invitation to Pay Additional Fees and Annex to Form PCT/ISA/206 Communication Relating to the Results of the Partial International Search from the International Search Authority dated Oct. 17, 2008, corresponding to PCT International Application No. PCT/US2007/079541, filed Sep. 26, 2007.

(Continued)

*Primary Examiner* — Bob Phunkulh
(74) *Attorney, Agent, or Firm* — Kilpatrick Townsend & Stockton LLP

(57) ABSTRACT

Systems, methods, and devices are described for scheduling and mapping upstream communications in a satellite communications system. The disclosure includes various channelization and frequency hopping techniques. A gateway is described to perform novel allocation of time slots on upstream frequency channels to allow frequency hopping. A subscriber terminal may perform frequency hopping according to the allocation, and the range may be limited to the transition range of a digitally controlled oscillator unit at the subscriber terminal. A gateway is described to allocate time slots on different upstream frequency channels in a prioritized manner. Subscriber terminals may receive the allocation, and then control the assignment of their upstream traffic to the time slots.

36 Claims, 21 Drawing Sheets

U.S. PATENT DOCUMENTS

| | | |
|---|---|---|
| 7,027,454 B2 | 4/2006 | Dent |
| 7,113,743 B2 | 9/2006 | Karabinis |
| 7,142,521 B2 * | 11/2006 | Haugli et al. ............ 370/320 |
| 7,142,809 B1 | 11/2006 | Godwin |
| 7,149,526 B2 | 12/2006 | Karabinis et al. |
| 7,203,204 B2 | 4/2007 | Carneal et al. |
| 7,336,967 B2 | 2/2008 | Kelly et al. |
| 7,415,001 B2 | 8/2008 | Naguleswaran et al. |
| 7,450,914 B2 | 11/2008 | Valdivia et al. |
| 7,590,083 B2 * | 9/2009 | Haugli et al. ............ 370/320 |
| 7,639,639 B2 * | 12/2009 | Herdin ............ 370/315 |
| 7,995,515 B2 | 8/2011 | Thesling |
| 2002/0021678 A1 | 2/2002 | Heatwole et al. |
| 2002/0031120 A1 | 3/2002 | Rakib |
| 2002/0032003 A1 | 3/2002 | Avitzour et al. |
| 2003/0027522 A1 | 2/2003 | Valdivia et al. |
| 2003/0032391 A1 | 2/2003 | Schweinhart et al. |
| 2003/0032427 A1 | 2/2003 | Walsh et al. |
| 2003/0073435 A1 | 4/2003 | Thompson et al. |
| 2004/0023658 A1 | 2/2004 | Karabinis et al. |
| 2004/0157560 A1 | 8/2004 | Yamasaki |
| 2006/0111041 A1 | 5/2006 | Karabinis |
| 2006/0126552 A1 | 6/2006 | Lee et al. |
| 2008/0298299 A1 | 12/2008 | Thesling |
| 2009/0081946 A1 | 3/2009 | Dankberg et al. |
| 2009/0092037 A1 | 4/2009 | Hadad |
| 2009/0129334 A1 | 5/2009 | Ma et al. |

FOREIGN PATENT DOCUMENTS

| | | |
|---|---|---|
| GB | 2 320 162 A | 6/1998 |
| WO | WO 96/20538 A2 | 7/1996 |
| WO | WO 97/25787 A | 7/1997 |
| WO | WO 00/05904 A2 | 2/2000 |
| WO | WO 2006/071155 A | 7/2006 |
| WO | WO 2008/100341 A2 | 8/2008 |

OTHER PUBLICATIONS

PCT International Search Report and Written Opinion, dated Mar. 3, 2009, from the European Patent Office; PCT/US2007/079541, filed Sep. 26, 2007.

Notification of Publication and of Entry into Substantive Examination Procedure for Patent Application for Invention for Chinese Patent Application No. CN 200780040611,dated Nov. 20, 2009, 3 pages.

Supplemental Notice of Allowability of Jul. 7, 2011 for U.S. Appl. No 12/174,674, 3 pages.

Notice of Allowance and Examiner-Initiated Interview Summary of Mar. 31, 2011 for U.S. Appl. No. 12/174,674, 15 pages.

* cited by examiner

900
Forward Channel
Diagram

MF-TDMA FREQUENCY HOPPING

CROSS-REFERENCES TO RELATED APPLICATIONS

This application is a Continuation of International Application No. PCT/US2007/079541, filed Sep. 26, 2007, entitled "Upstream Resource Allocation for Satellite Communications", and claims the benefit thereof under 35 U.S.C. 120, which claims the benefit under 35 U.S.C. 119(e) of U.S. Provisional Patent Application No. 60/827,999, filed Oct. 3, 2006, entitled "Upstream MF-TDMA Frequency Hopping" and U.S. Provisional Patent Application No. 60/827,994, filed Oct. 3, 2006, entitled "Upstream Resource Optimization". This application is related to the following U.S. patent application: U.S. patent application Ser. No. 12/174,674, filed concurrently herewith, entitled "Upstream Resource Optimization". This application hereby incorporates by reference herein the content of the aforementioned applications in their entirety and for all purposes.

This application expressly incorporates by reference each of the following patent applications in their entirety for all purposes:
PCT Application Ser. No. PCT/US2007/079577, filed on Sep. 26, 2007, entitled "Improved Spot Beam Satellite Ground Systems";
PCT Application Ser. No. PCT/US2007/079561, filed on Sep. 26, 2007, entitled "Multi-Service Provider Subscriber Authentication";
PCT Application Ser. No. PCT/US2007/079565, filed on Sep. 26, 2007, entitled "Large Packet Concatenation In Satellite Communication System";
PCT Application Ser. No. PCT/US2007/079569, filed on Sep. 26, 2007, entitled "Upfront Delayed Concatenation In Satellite Communication System";
PCT Application Ser. No. PCT/US2007/079571, filed on Sep. 26, 2007, entitled "Map-Trigger Dump Of Packets In Satellite Communication System";
PCT Application Ser. No. PCT/US2007/079563, filed on Sep. 26, 2007, entitled "Web/Bulk Transfer Preallocation Of Upstream Resources In A Satellite Communication System";
PCT Application Ser. No. PCT/US2007/079567, filed on Sep. 26, 2007, entitled "Improved Spot Beam Satellite Systems";
PCT Application Ser. No. PCT/US2007/079523, filed on Sep. 26, 2007, entitled "Packet Reformatting For Downstream Links"; and
PCT Application Ser. No. PCT/US2007/079541, filed on Sep. 26, 2007, entitled "Upstream Resource Allocation For Satellite Communications".

BACKGROUND OF THE INVENTION

Consumer broadband satellite services are gaining traction in North America with the start-up of star network services using Ka band satellites. While such first generation satellite systems may provide multi-gigabit per second (Gbps) per satellite overall capacity, the design of such systems inherently limits the number of customers that may be adequately served. Moreover, the fact that the capacity is split across numerous coverage areas further limits the bandwidth to each subscriber.

While existing designs have certain capacity limitations, the demand for such broadband services continues to grow. The past few years have seen strong advances in communications and processing technology. This underlying technology, in conjunction with selected novel upstream scheduling techniques, may be utilized for satellite communications systems and components configured to address this demand.

BRIEF SUMMARY OF THE INVENTION

Systems, methods, and devices are described for scheduling and mapping upstream communications in a satellite communications system. Embodiments of the invention include various channelization and frequency hopping techniques.

In one set of embodiments, a novel allocation of resources may be performed for upstream frequency channels to allow frequency hopping. This allocation may be performed by a gateway device. In one embodiment, a determination is made that a traffic load on a first one of a number of adjacent frequency channels exceeds a first threshold capacity. A second one of the frequency channels is selected. The selection is based in part because an identified subscriber terminal transmitting on the first channel is configured with a digitally controlled oscillator unit able to transition between the first frequency channel and the second frequency channel during a transition period. Other factors that may be used in the selection of the second frequency channel are described, as well.

Time slots are allocated to the subscriber terminal in the first and second frequency channels to allow frequency hopping between the first frequency channel and the second frequency channel for respective time slot allocations. A subscriber terminal may perform frequency hopping according to the allocation.

In another set of embodiments, time slots may be allocated on different upstream frequency channels in a prioritized manner. This allocation may also be performed by a gateway device. In one embodiment, data is received from each of a number of subscriber terminals signaling requests for upstream satellite transmission capacity for a time period. Some of the requested capacity is identified with transmission specifications limiting latency and packet spacing variance, the limitations exceeding a threshold level. This identified capacity is classified as prioritized traffic.

Time slots are allocated first to the prioritized traffic, and subsequently to the remaining requests. The combined allocation for a time period is generated for each of the subscriber terminals, the combined allocation made up of a generalized block of time slots for the time period to be used as determined by respective subscriber terminals. Subscriber terminals may receive the allocation, and then control the assignment of their upstream traffic to the time slots based on their own priority determinations.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, methods, and devices are described for scheduling upstream satellite communications. Various mapping, channelization, and frequency hopping techniques are described for upstream satellite signals. The description herein provides example embodiments only, and is not intended to limit the scope, applicability, or configuration of the invention. Rather, the description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
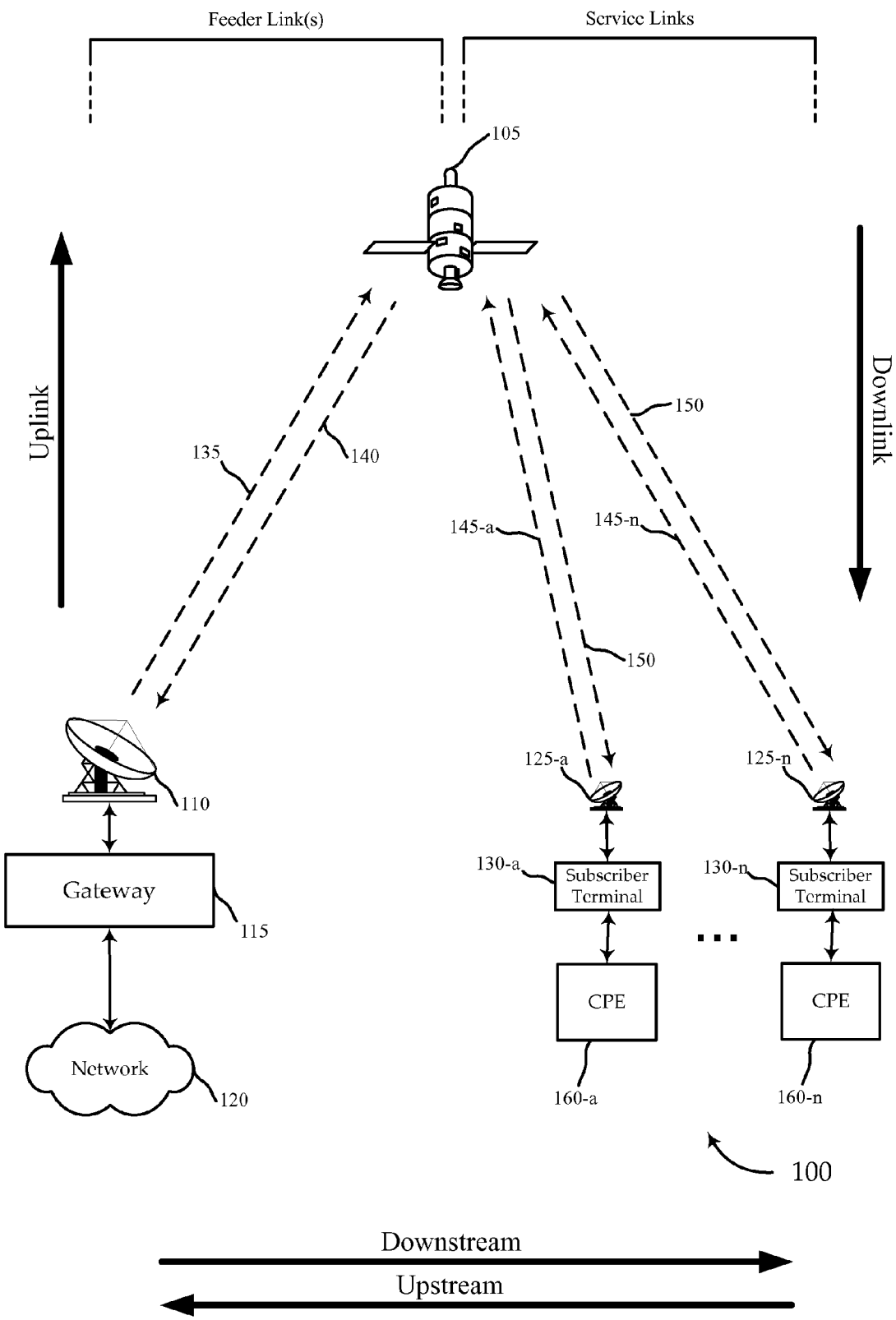
FIG. 1 is a block diagram of a satellite communications system configured according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the subscriber terminal 130. The gateway 115 may be configured to receive data and information directed to one or more subscriber terminals 130, and format the data and information for delivery downstream to the respective subscriber terminals 130 via the satellite 105. Similarly, the gateway 115 may be configured to receive upstream signals 140 from the satellite 105 (e.g., log-in information, resource requests, or other data from one or more subscriber terminals 130). The upstream signals may be directed to the gateway 115 or another destination in the network 120, and can format the received signals for transmission through the network 120.

A device (not shown) connected to the network 120 may, therefore, communicate with one or more subscriber terminals 130 through the gateway 115. Data and information, for example, IP datagrams, may be sent from a device in the network 120 to the gateway 115. The gateway 115 may format a frame in accordance with a physical layer definition for transmission to the satellite 105 via a downstream link 135. The novel scheduling and mapping messages described herein may be transmitted downstream by the gateway, setting forth scheduling on the upstream links. A variety of physical layer transmission modulation and coding techniques may be used with certain embodiments of the invention, including those defined with the DVB-S2 and WiMAX standards, or various modifications thereof.

In a number of embodiments, the gateway 115 utilizes Adaptive Coding and Modulation ("ACM") in conjunction with one or more of the downstream techniques described herein to direct messages to the individual terminals. The gateway 115 may use a broadcast signal, with a modulation and coding (modcode) format adapted to the link conditions of the terminal 130 or set of terminals 130 to which the packet is directed (e.g., to account for the variable service link 150 conditions from the satellite 105 to each respective terminal 130). Both scheduling messages and other data may be sent utilizing ACM.

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels, wherein subsets of the subscriber terminals are assigned to each sub-channel. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more subscriber terminals 130. In one embodiment, the satellite 105 operates in a multi-beam mode, transmitting a number of narrow beams, each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and subscriber terminal 130 together make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In various embodiments, time slots on a frequency channel or set of frequency channels are allocated for use to one or more subscriber terminals 130 (for exclusive use, or use on a contention basis). A Time-Division Multiple Access (TDMA) scheme may be employed in each frequency channel. In such a scheme, each frequency channel may be divided into several timeslots that can be assigned to a connection (i.e., a subscriber terminal 130). The allocation may be fixed, or may be performed in a more dynamic fashion. In some embodiments, packets with certain quality of service levels (e.g., real-time application with spacing requirements) may receive priority allocations. In other embodiments, one or more of the upstream links 140, 145 may be configured with other schemes, such as other TDMA, FDMA, OFDMA, CDMA, or any number of hybrid or other schemes known in the art.

A subscriber terminal 130, using the upstream links, may transmit to the gateway 115 current or future bandwidth needs or requests, requests for applications or services, information related to signal quality, etc. A subscriber terminal 130 may also transmit data and information to a network 120 destination via the satellite 105 and gateway 115. A subscriber terminal 130 may transmit the signals according to a variety of physical layer transmission modulation and coding techniques. In various embodiments, the physical layer techniques may be the same for each of the links 135, 140, 145, 150, or may be different. The gateway 115 may use the resource request information to allocate time slots and frequency channels on upstream links to particular subscriber terminals 130. The gateway 115 may, in some embodiments, allocate sets of frequency channels to subscriber terminals 130 for upstream communication based on the downstream sub-channel identifier associated with each respective subscriber terminal 130. The gateway 115 may also use the signal quality information to implement Adaptive Coding and Modulation (ACM), adjusting the modcode formats to each terminal or set of terminals based on their link conditions.

In one embodiment, a gateway 115 includes a Satellite Modem Termination System (SMTS), which is based at least in part on the Data-Over-Cable Service Interface Standard (DOCSIS). The SMTS in this embodiment includes a bank of modulators and demodulators for processing signals to be transmitted to or signals received from subscriber terminals 130. The SMTS in the gateway 115 performs the real-time scheduling of the signal traffic through the satellite 105, and provides the interfaces for the connection to the network 120. In other embodiments, the scheduling operations may be performed by other components or devices employing other standards.

In this embodiment, the subscriber terminals 130 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) may be used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a reduced number of space hardware elements. Spotbeam size and TWTA power may be optimized to achieve maximum flux density on the earth's surface of −118 decibel-watts per meter squared per megahertz ($dbW/m^2/MHz$).

Figure 2:
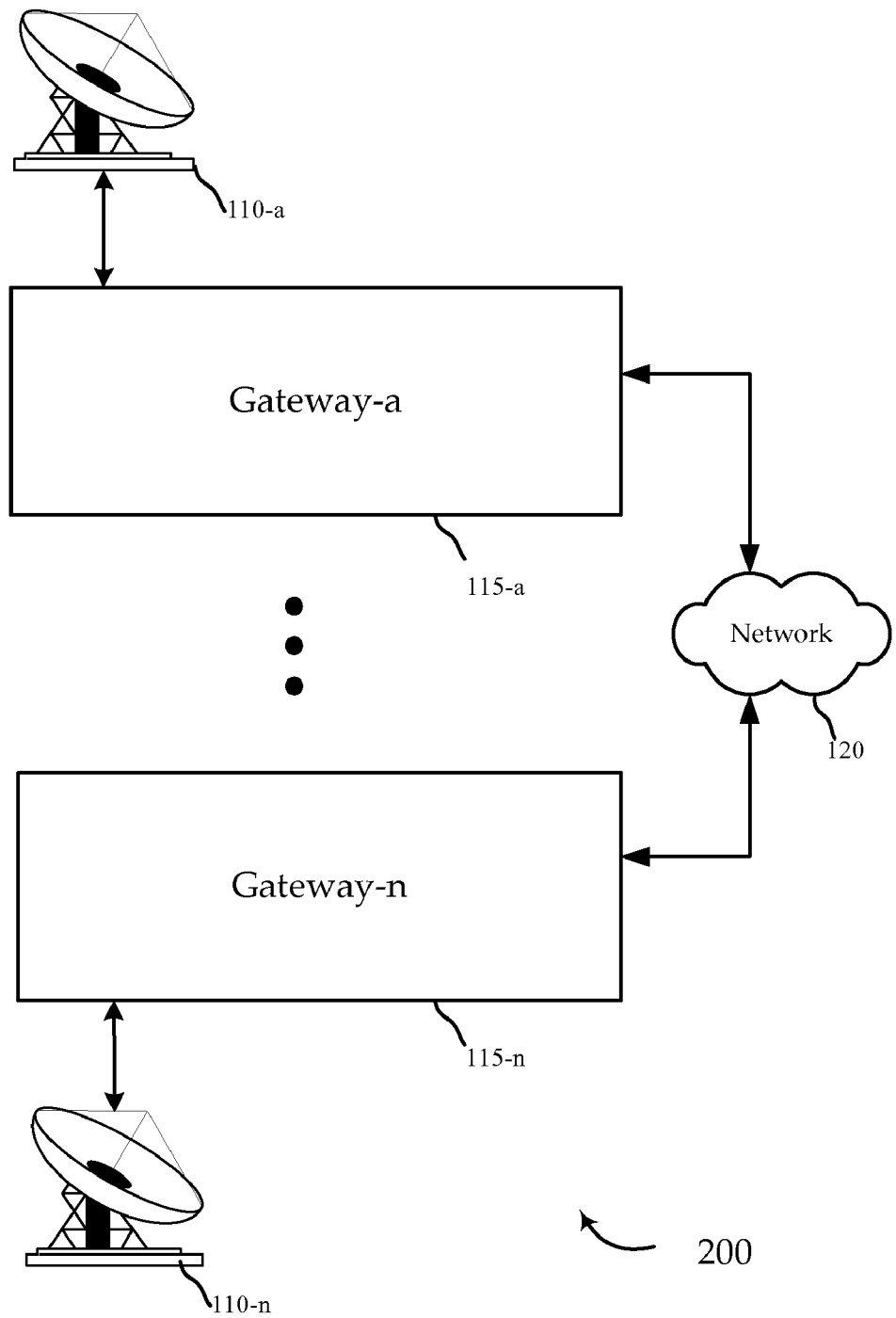
FIG. 2 is a block diagram of a ground system of gateways configured according to various embodiments of the invention.

Referring next to FIG. 2, an embodiment of a ground system 200 of gateways 115 is shown in block diagram form. One embodiment may have fifteen active gateways 115 (and possibly spares) to generate sixty service spot beams, for example. The ground system 200 includes a number of gateways 115 respectively connected with antennas 110. The gateways 115 are also each connected to a network 120.

In one embodiment, a gateway 115 (e.g., gateway 115 of FIG. 1) may upconvert and amplify a baseband signal (including data received from the network 120 or another gateway, and formatted according to various embodiments of the invention) for transmission through the downstream link 135 via the antenna 110 to a particular subscriber terminal 130. Each gateway 115 may also downconvert the upstream links 140, and perform other processing as explained below (perhaps for forwarding through the network 120). Each gateway 115 may process signals to allow the subscriber terminals 130 to log-in, and request and receive information, and may schedule bandwidth. Additionally, a gateway 115 may provide configuration information and receive status from the subscriber terminals 130. Any requested or otherwise received information may be forwarded through the network.

Figure 3:
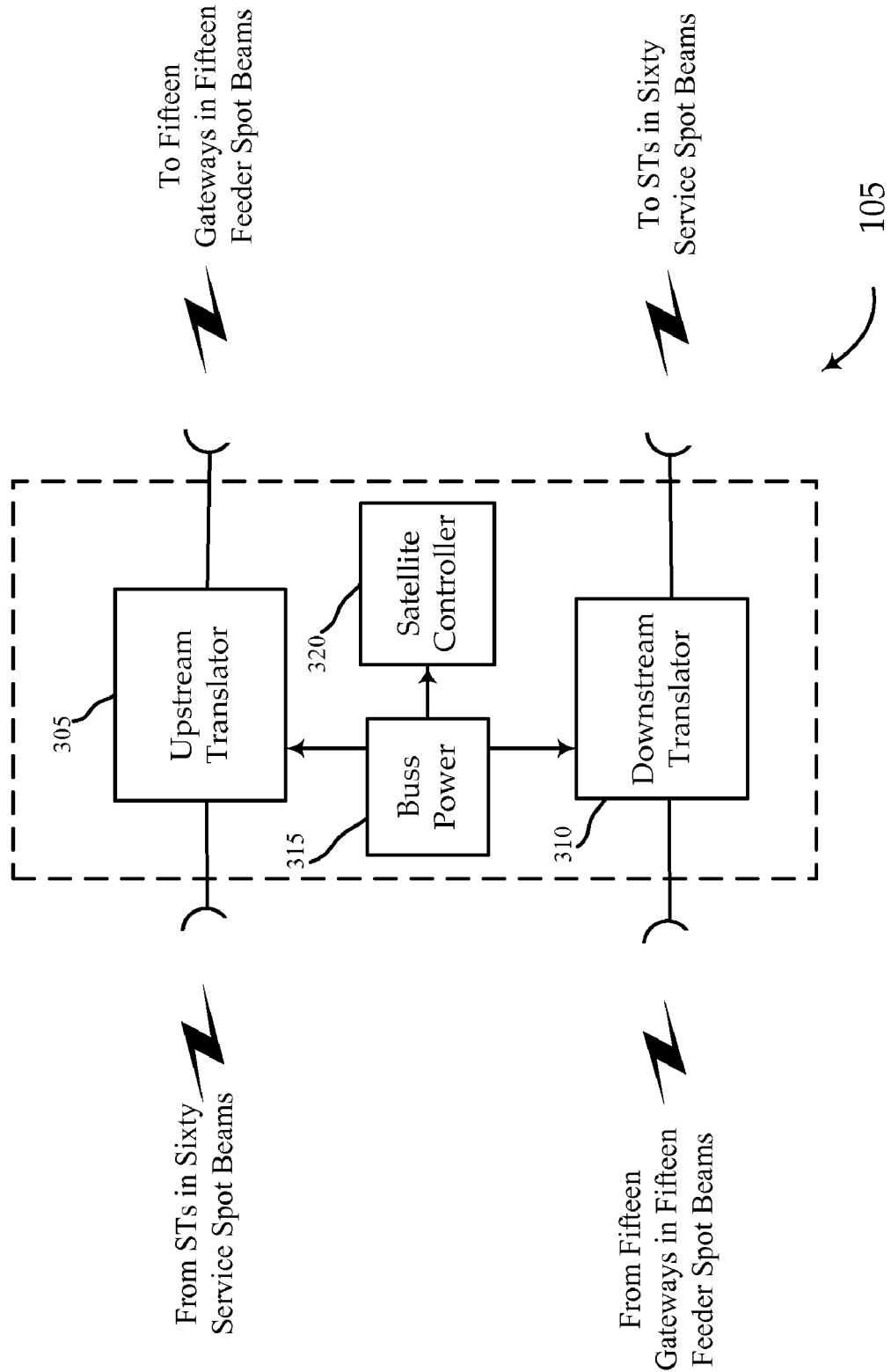
FIG. 3 is a block diagram of a satellite configured according to various embodiments of the invention.

Referring next to FIG. 3, an embodiment of a satellite 105 is shown in block diagram form. The satellite 105 in this embodiment communicates with fifteen gateways 115 and a number of subscriber terminals 130 using sixty feeder and service spot beams. Other embodiments could use more or fewer gateways/spot beams. There may be any number of subscriber terminals 130 divided by geography between the service link spot beams. Buss power 315 is supplied using a power source such as chemical fuel, nuclear fuel, and/or solar energy. A satellite controller 320 is used to maintain altitude and otherwise control the satellite 105. Software updates to the satellite 105 can be uploaded from the gateway 115 and performed by the satellite controller 320.

Information passes in two directions through the satellite 105. A downstream translator 310 receives information from the fifteen gateways 115 (e.g., formatted according to embodiments of the invention) for relay to subscriber terminals 130 using sixty service spot beams. An upstream translator 305 receives information from the subscriber terminals 130 occupying the sixty spot beam areas and relays that information (e.g., log-in or signal quality information) to the fifteen gateways 115. This embodiment of the satellite can switch carrier frequencies in the downstream or upstream translators 310, 305 in a "bent-pipe" configuration, but other embodiments could do baseband switching between the various forward and return channels. The frequencies and polarization for each spot beam may be programmable or preconfigured.

I. Frequency Hopping: In another set of embodiments, systems, devices, and methods are described for the allocation and use of upstream frequency channels for frequency hopping. A variety of transmission techniques may be used for the upstream service links 145 and feeder links 140 from the subscriber terminals 130 of the system 100 of FIG. 1. For example, the DVB-S or DVB-S2 standards may be used in a manner known in the art. More specifically, a multi frequency-time division multiple access (MF-TDMA) technique may be used, such as the MF-TDMA scheme set forth in the Digital Video Broadcasting-Return Channel Satellite (DVB-RCS) standard. Either a fixed-slot or dynamic slot MF-TDMA system may be used. Alternatively, these or other standards may be modified in accordance with one or more of the principles described below. For example, the DVB-RCS standard and other transmission techniques utilizing MF-TDMA may be modified to provide for dynamic frequency hopping in accordance with certain range limitation parameters.

Consider an MF-TDMA scheme in which a subscriber terminal 130 transmits signals upstream to a gateway 115 via a satellite 105 using one of a set of carrier frequencies. The frequency range available for transmission is divided up into a series of frequency channels, and the subscriber terminal 130 may change its carrier frequency to transmit on the different channels. The bandwidth for each frequency channel may be fixed or variable, and the channel size may be the same or different bandwidths. The bandwidth of a given channel may vary dynamically with time. Also, it is worth noting that while certain frequency ranges may be allocated to specific terminals 130, other bands may be available for upstream use on a contention basis. Also, certain control or other upstream signals may be transmitted on bandwidth available according to other transmission schemes. Within a given frequency channel, a subscriber terminal 130 may be given certain time slots for transmission.

In one embodiment, the gateway 115 schedules the channel frequency and time allocations for the subscriber terminals (e.g., with MAP messages), and transmits this control information downstream to subscriber terminals 130. The gateway may receive noise, interference, and other information about the channels from subscriber terminals 130, the satellite 105, other gateways 115-$n$, or other sources, and use this information in identifying channel widths, and allocating channels and time to subscriber terminals 130.

Figure 4:
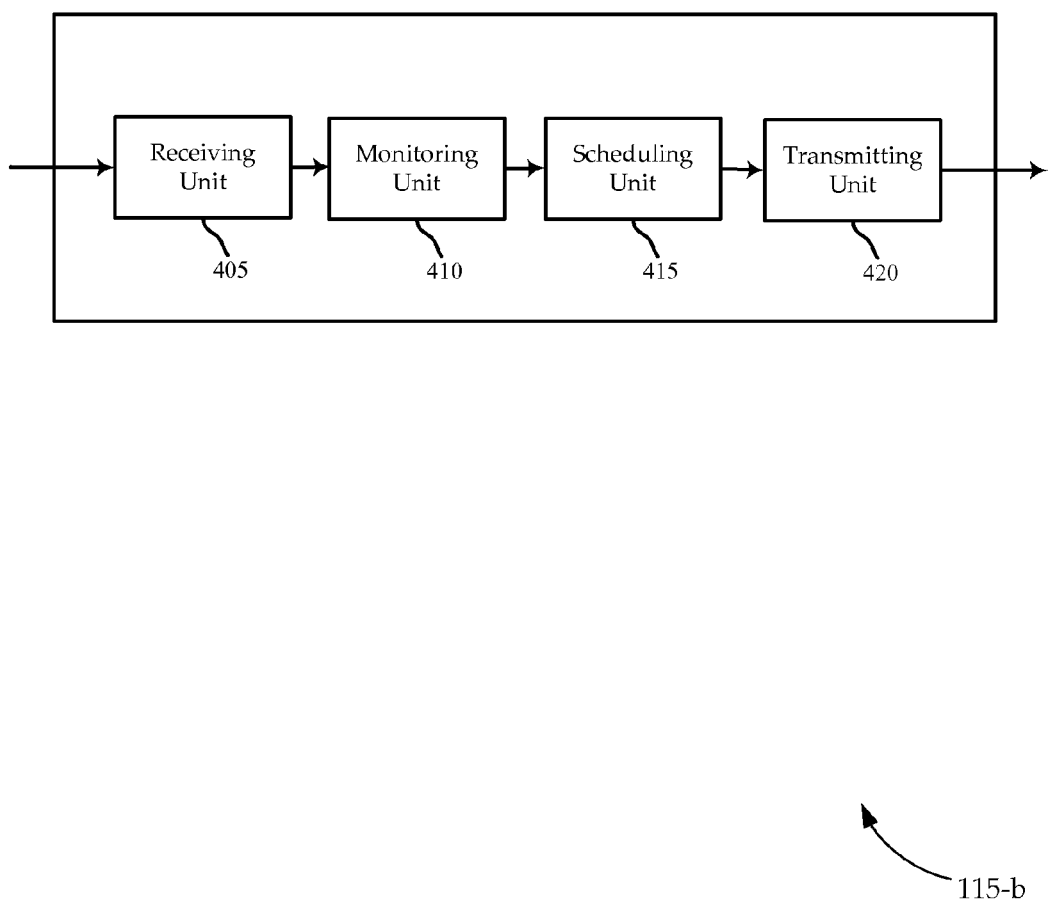
FIG. 4 is a block diagram of a gateway device configured according to various embodiments of the invention.

Referring next to FIG. 4, an embodiment of a gateway 115-$b$ is shown in block diagram form. This may be the gateway 115 of FIG. 1, and various aspects of FIG. 1 will be used in describing the functionality of the gateway 115-$b$. The gateway 115-$b$ may be configured to allocate time slots on different upstream frequency channels to given subscriber terminal 130, and this allocation scheme may in one embodiment be employed to allow increased packing efficiency for the upstream links 140, 145.

In one embodiment, the gateway 115-$b$ includes a receiving unit 405, a monitoring unit 410, a scheduling unit 415, and a transmitting unit 420, each of which may be in communication with each other directly or indirectly. In some embodiments, a device may include only a subset of these units, or may include additional units. The units of the device 115-$b$ may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiving unit 405 may be configured to receive a variety of information from the subscriber terminals 130 (via the satellite 105). This information may, for example, include log-in information, signal quality measurements, and service and bandwidth requests. This information may be transmitted from the subscriber terminals 130 to the gateway 115 via the upstream links 140, 145. The upstream links 140, 145 may be made up of a number of adjacent frequency channels allocated for upstream satellite communications, wherein time slots on different channels are allocated to particular subscriber terminals 130. Alternatively, information may be received from one or more devices on the network 120 that compile information passed from the subscriber terminals 130 or other sources. The receiving unit 405 may also receive a set of data (e.g., from the network 120) to be transmitted via the satellite 105 and destined for one or more subscriber terminals 130.

The monitoring unit 410 of the gateway 115-b may be configured to monitor a traffic load on each of the upstream frequency channels (e.g., a set of adjacent frequency channels) for the upstream links 140, 145. The monitoring unit 410 may then determine that the traffic load on a first frequency channel of the frequency channels exceeds a threshold capacity level. This determination may be made for an estimated or actual traffic load, and the traffic load may be a current or future load. The threshold may in alternative embodiments be a fixed or dynamic percentage of capacity (e.g., the dynamic threshold could vary with overall traffic, and thus there might be a higher threshold when the traffic is heavier).

When the determination is made, the scheduling unit 415, in communication with the monitoring unit 410, is configured to identify a subscriber terminal transmitting upstream on the first frequency channel. The scheduling unit 415 may select a second frequency channel (e.g., an adjacent or nearby frequency channel). The second frequency channel may be selected because it has available capacity and because the subscriber terminal 130 has a digitally controlled oscillator unit capable of transitioning between the first frequency channel and the second frequency channel (e.g., within the available time interval).

The scheduling unit 415 may allocate a first series of future time slots in the first frequency channel to the subscriber terminal 130, and allocate a second series of future time slots in the second frequency channel to the subscriber terminal 130. The first and second series may be mutually exclusive so as to allow the subscriber terminal to hop between the first frequency channel and the second frequency channel for respective time slot allocations. A transmitting unit 420, in communication with the scheduling unit 415, may be configured to transmit data including the first and second series of allocations to the subscriber terminal 130.

The functionality and options for certain units will now be explored in greater depth. The receiving unit 405 may receive data messages (e.g., on the upstream links 140, 145) from a number of the subscriber terminals 130. Some of the subscriber terminals 130 may be transmitting on the first frequency channel. In one embodiment, the subscriber terminals 130 may request additional current or future upstream bandwidth, or send data attempting to initiate a range of other services. These messages may, in some embodiments, be piggybacked on data transmissions. A number of mechanisms may be used for the requests, including a modified DOCSIS request or modified RSVP request, adapted for use in the system 100 according to the parameters included herein. The messages may include an indication of the rate and/or duration of requested transmission, along with the type of traffic involved in the transmission. A single subscriber terminal 130 may request more than one allocation for a given time period (e.g., sending multiple messages). Thus, different streams from a single subscriber terminal 130 may receive different allocations.

This traffic type information may be indicated in a variety of ways, as known in the art. Various protocols also include "type" fields which characterize the traffic. Alternatively, port numbers, IP addresses, and protocol identifiers may be used to identify types of traffic. A number of alternative options are available, as evident to those skilled in the art. In addition to the type indication, the packet may also include additional class of service (CoS)/quality of service (QoS) parameters.

The receiving unit 405 may also be configured to receive data from a subscriber terminal indicating the range in which the digitally controlled oscillator unit is capable of transitioning to (e.g., from the first frequency channel, or more generally). The data may include information on the speed in which such transitions may be made. In still other embodiments, determinations regarding bandwidth needs and transition ranges may be made more independently by the gateway 115-b, relying on historic requirements or other estimation algorithms based on monitored traffic composition.

The monitoring unit 410 may use any of the data received by the receiving unit 405 (or may use other data) in the determination as to whether the traffic load on the first frequency channel exceeds the threshold capacity (e.g., a current or future threshold capacity). The received data may, therefore, trigger the traffic load on the first frequency channel to exceed the first threshold capacity, either based on specific bandwidth requests or other bandwidth allocations. The threshold may be a set or variable percentage below the actual or estimated capacity, and the threshold may be varied depending on traffic conditions. In addition, an imbalanced load on certain frequency channels may trigger a swapping or reallocation for subscriber terminals 130 across frequency channels.

The scheduling unit 415 may include memory to store a table or other data structure allocating time slots on one (or more) frequency channels to each subscriber terminal 130 (e.g., by associating data link addresses or other identifier(s) for each subscriber terminal 130 with certain time slots). In addition, the table may include information for each of the subscriber terminals 130 (or a set of terminals) indicating their frequency hopping abilities (e.g., range, transition speed, settling time, etc.). These abilities may be stored, received from the network 120, or transmitted by each subscriber terminal 130 based on real-time assessments on current frequency channels.

The scheduling unit 415 may thereby determine frequency hopping range for each of the subscriber terminals 130. When the monitoring unit 410 determines that a traffic load on a given frequency channel exceeds the threshold, the frequency hopping abilities of the subscriber terminals 130 may be used in determining which terminal 130 will have some future allocation moved to another frequency channel.

For a given subscriber terminal 130, the scheduling unit 415 may be configured to initially identify one, two, or more frequency channels to which the digitally controlled oscillator unit is capable of transitioning to from the first frequency channel. In another embodiment, the set of channels identified for possible frequency hopping may be limited to transitions which may be performed coherently, limited to certain adjacent ranges of frequency, limited to closest channels with available capacity, etc.

In selecting the second frequency channel from the identified options, a particular selection may be based in part because the second frequency channel: 1) includes a time slot that can be transitioned to coherently from the first frequency channel, 2) is the closest channel from the first frequency channel, 3) is the closest channel with available capacity, 4) is the channel within a range (e.g., 2 MHz above or below a current channels), 5) is an available channel with more available capacity than other available channels, 6) has a lower transitional settling time than other available channels, 7) is a channel which may have better options for future digital transitioning, 8) meets any combination of the above factors.

While the selection of a possible set of channels for frequency hopping and the identification of a particular channel for frequency hopping are described as separate steps, it is worth noting that the steps may be combined, as well. Thus, a subset of the factors cited above may be accounted for according to various weightings, and a determination of the frequency hopping channel may be made based thereon.

Figure 5:
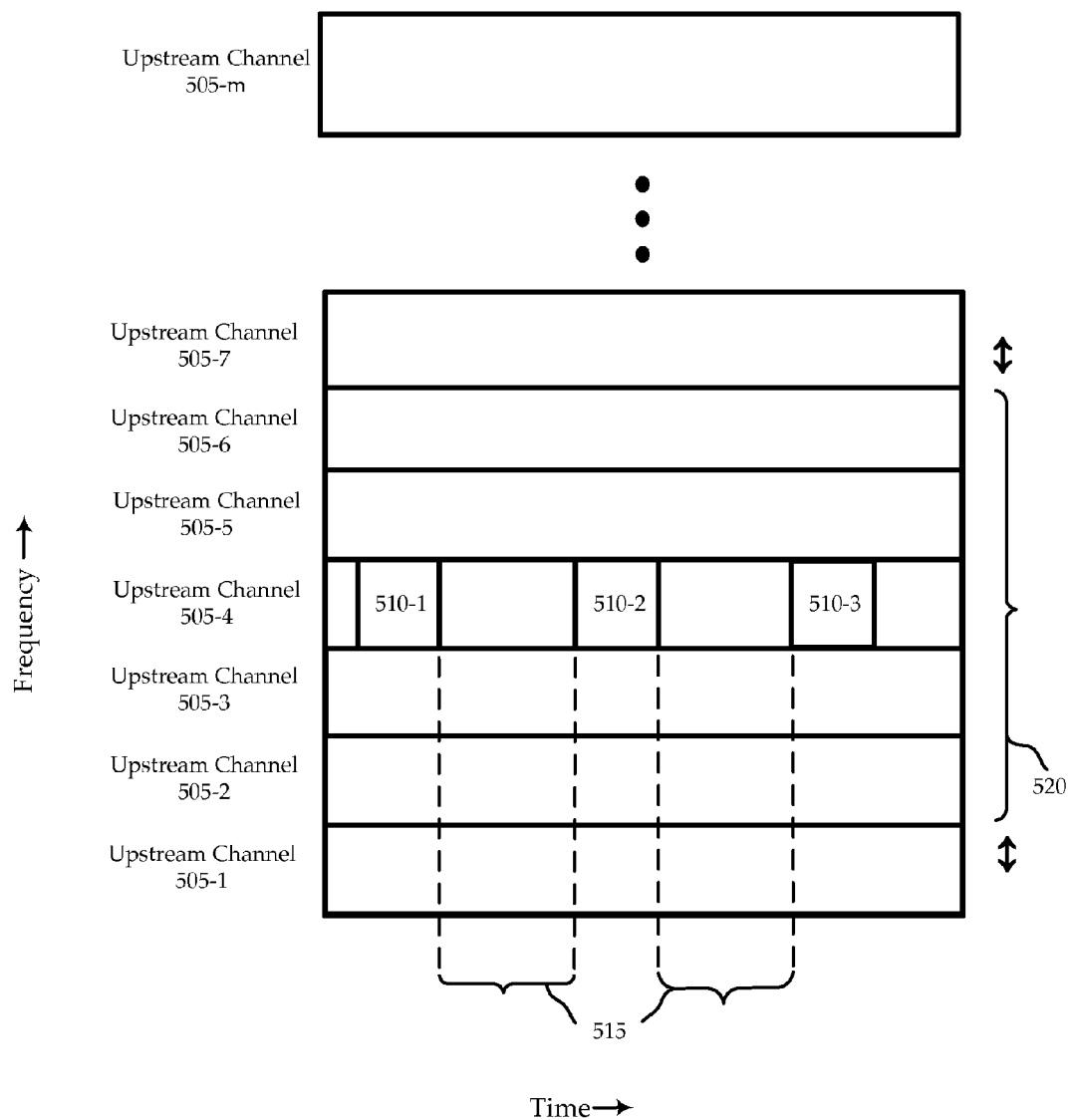
FIG. 5 is a block diagram illustrating a channelization format according to various embodiments of the invention.

Turning to FIG. 5, a diagram 500 illustrating a set of upstream frequency channels 505 is shown. In this embodiment, assume that a gateway 115 of FIG. 1 has allocated a subscriber terminal 130 certain time slots 510 on a given upstream channel 505-4. The gateway 115 may then determine that the channel capacity is insufficient for the current or future traffic (e.g., because the traffic load in the channel exceeds a threshold). For example, perhaps the subscriber terminal 130 requests additional upstream capacity, and the channel 505-4 is fully allocated or is loaded above a certain threshold during the previously unallocated time slots 515. Alternatively, a competing subscriber terminal 130-n may have requested more upstream capacity during such time slots. A number of other possibilities exist which would give rise to a dynamic frequency hopping scenario, as evident to those skilled in the art. Thus, at the time slots 515 when the subscriber terminal 130 is not transmitting on its existing channel, a frequency synthesizer at the subscriber terminal 130 may be controlled to change the carrier frequency to allow the terminal 130 to transmit on other channels (505-1-505-3, 505-5-505-m).

Various embodiments of the invention, described above, may narrow the range of channels available for frequency hopping. In one embodiment, the gateway 115 uses various criteria to identify a set of channels 520 for dynamic frequency hopping, and then identifies one or more channels of that set for allocating capacity to the subscriber terminal 130. In one embodiment, the set of channels 520 identified for possible frequency hopping may be limited to those channels 520 that may be transitioned to digitally by the digitally controlled oscillator.

Figure 6:
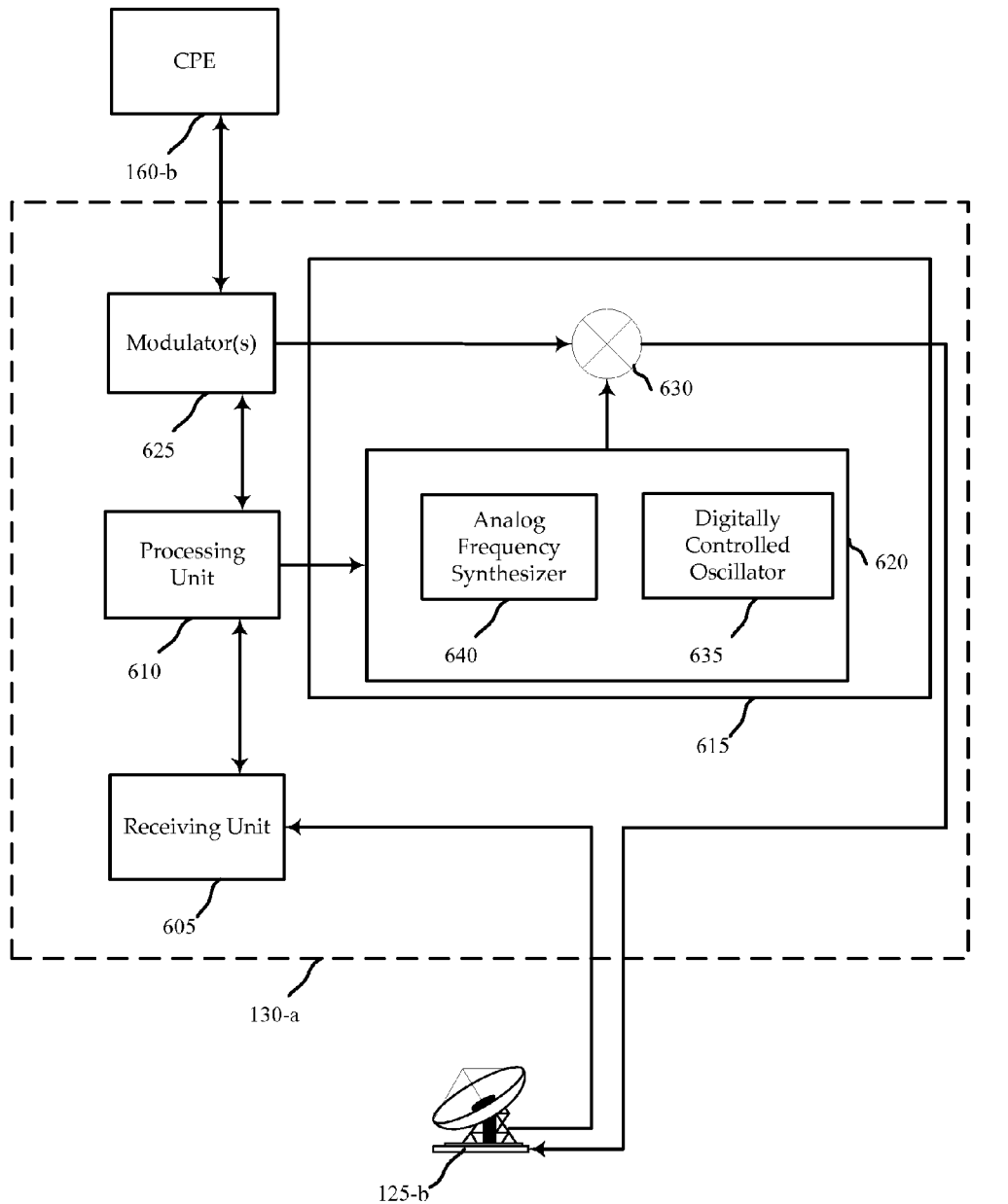
FIG. 6 is a block diagram of a subscriber terminal device configured according to various embodiments of the invention.

In accordance with the above description, movement from one carrier to another is possible on a burst-by-burst basis in some embodiments. A subscriber terminal 130 may be configured to frequency hop dynamically (i.e., without carrying traffic for any significant length of time). Frequency transition is made without requiring log off or disablement during a frequency transition. Turning next to FIG. 6, a block diagram 600 is shown illustrating certain components of a subscriber terminal 130-a, such as the subscriber terminal 130 of FIG. 1, configured for dynamic upstream frequency hopping transmissions. The subscriber terminal 130-a in this embodiment includes a receiving unit 605, a processing unit 610, an RF frontend 615, and one or more modulator(s) 625. The subscriber terminal 130-a in this embodiment may be in communication with the gateway 115 described with reference to FIG. 1, 2, or 4.

In some embodiments, a device may include only a subset of these units, or may include additional units. The units of the device 130-a may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The one or more modulator(s) 625 of the subscriber terminal 130-b may receive data from customer premises equipment 160-b or other sources, and encode and modulate the data to produce a modulated signal. The modulated signal is transmitted to an RF frontend 615, where it may be processed by any number of amplifiers and filters (not shown). A frequency synthesizer 620 in the RF frontend 615 produces a carrier signal, and a mixer 630 in the RF frontend 615 mixes the carrier and modulated signal to produce an upconverted signal. This signal may then be processed by any number of amplifiers and filters (not shown), to thereby produce a signal for transmission to a satellite 105 via an antenna 125-b.

The frequency synthesizer 620 may include an analog frequency synthesizer unit 640 and a digitally controlled oscillator (DCO) unit 635. The analog frequency synthesizer 640, such as an analog PLL frequency synthesizer, may be able to produce a broader range of frequencies, but there may be issues related to settling time. A DCO 635 may be capable of quickly synthesizing a very wide range of precise frequency ratios, but may have less range than its analog counterpart. A frequency change may be implanted in a DCO 635 by writing a value into a register, the value associated with a sinewave sample stored in a look-up table. This waveform is sent to a digital-to-analog converter to produce an analog waveform, to produce the desired frequency. This may allow for faster frequency changes, which may be conducive to the frequency hopping environment. While in this embodiment the frequency synthesizer 620 includes an analog frequency synthesizer unit 640 and DCO unit 635, in other embodiments there may be a standalone analog or digital frequency synthesizer, or there may be a combination in series. A control signal may be received by the frequency synthesizer from a processing unit 610 to control the frequency synthesizer 620. Mapping data used to produce the control signal may be received from the gateway 115 with a receiving unit 605 at the subscriber terminal 130-a, and passed to the processing unit 610.

In one embodiment, the analog frequency synthesizer unit 640 is configured to tune an output signal to a frequency within a frequency range allocated for upstream satellite communications. For example, the analog frequency synthesizer unit 640 may be configured to tune an output signal to a frequency in the center channel of a number of adjacent channels that may be available for allocation to the subscriber terminal 130-a to transmit upstream signals. The DCO unit 635 may be configured to vary the output signal among a set of carrier frequencies within a portion (or all) of the frequency range, each carrier frequency of the set corresponding to a channel. For example, the portion of the frequency range may be the identified set of channels 520 in FIG. 5 allocated for dynamic frequency hopping. The set of channels 520 identified for possible frequency hopping may be limited to those channels 520 that may be transitioned to digitally by the DCO unit 635, or may be even further limited.

The receiving unit 605 may receive data (e.g., from gateway 115-b) mapping the wireless upstream signals to different ones of the set of carrier frequencies in a series of time slots. The determination regarding carrier frequencies at the gateway 115-b may be limited to carrier frequencies that may be transitioned to digitally by the DCO unit 635, or according to other criteria. The processing unit 610 may be configured to control the digitally controlled oscillator unit to cause the varied output signal to hop between carrier frequencies according to the received mapping data from the gateway 115-b.

In one embodiment, the processing unit 610 determines the set of carrier frequencies that the DCO unit 635 is capable of transitioning to during an available transition time. The transition time may be set dynamically by the processing unit 610 or a gateway 115-b, or may be predetermined. The processing unit 610 may generate a set of data for transmission, the set of data identifying the carrier frequencies available for transition and perhaps identifying transition times, as well. The processing unit 610 may set or advise further limits on the carrier frequencies which may be transitioned to, based on a determination of settling time, whether a channel may be transitioned to coherently, whether a channel is within a specified range, etc. The processing unit 610 may also identify or estimate current or future bandwidth requirements and associated traffic types, and generate data for transmission including this information.

In certain embodiments, a sub-channelization format may be used for downstream transmission, and the upstream channelization formatting may correspond to differing degrees with the downstream formatting. To better illustrate the options, the downstream formatting will be described first. After the description of downstream formats is concluded, the discussion will return to the corresponding upstream options.

Figure 7:
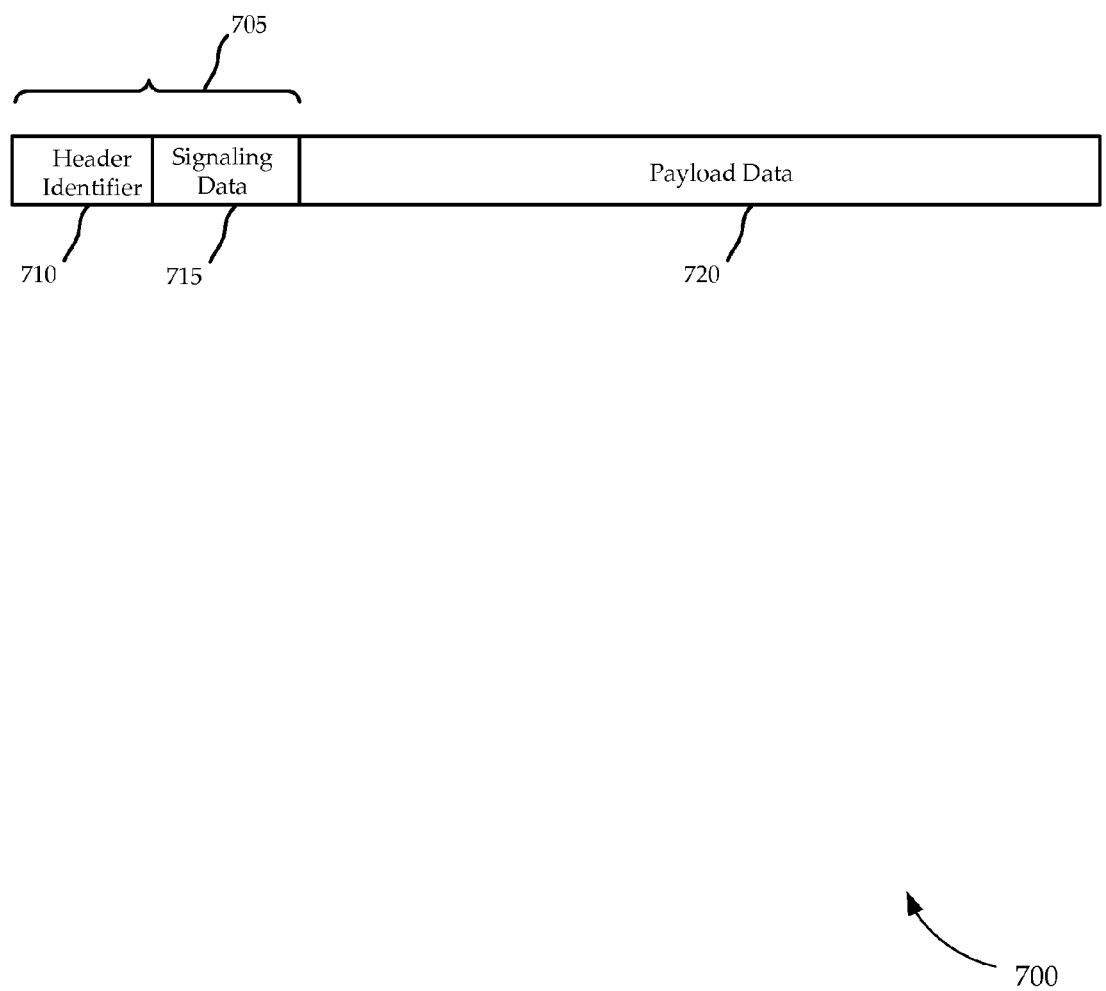
FIG. 7 is a block diagram of a frame formatted according to various embodiments of the invention.

A gateway 115 (e.g., the gateway of FIG. 1, 2, or 4) may encapsulate data (e.g., scheduling or other data) to be transmitted via the satellite 105 to a subscriber terminal 130 (e.g., the subscriber terminal of FIG. 1 or 6). FIG. 7 is a block diagram illustrating an example frame format 700 that may be used for such downstream transmission. A physical layer header 705 includes a header identifier 710 and signaling data 715. The header identifier 710 may be one of a set of unique identifiers, so that its known sequence may be readily identified. For example, the destination subscriber terminal 130 may use known patterns (one or more valid header identifiers) to correlate with a received signal. Destination subscriber terminals 130 may also be configured to store different sets of header identifiers 710, and thus frames may be filtered based on header identifier 710.

The remainder of physical layer header 705, the signaling data 715, includes the modcode data and a sub-channel identifier. The modcode data identifies the modulation and coding (e.g., the particular codeword sizes, code rates, modulation schemes, and pilot insertions) for encoded and modulated payload data 720 that is appended to the physical layer header 705. The physical layer header 705 (or parts thereof) may be protected by very low code rates so that it may be reliably received during poor SNR conditions. The encoded and modulated payload data 720, however, is in many embodiments adaptively coded on a per-terminal (or per-set of terminals) basis. By way of example, a subscriber terminal 130 receiving a transmitted signal at a very low SNR may receive a frame in which the encoded and modulated payload data 720 has been encoded at a very low code rate and at a very low order modulation. Conversely, a terminal 130 receiving a transmitted signal at a very high SNR may receive a frame in which the encoded and modulated payload data 720 has been encoded at a very high code rate and at a very high order modulation.

In addition, the signaling data includes a sub-channel identifier configured to identify different frames as belonging to particular sub-channels. By utilizing sub-channel identifiers in a physical layer header 705, receiving devices (e.g., the subscriber terminals 130) may filter packets based on the sub-channel identifier without demodulating or decoding the payload data 720. Thus, the information to be demodulated and decoded (e.g., payload data 720 directed to other sub-channels and other subscriber terminals 130) may be limited or otherwise filtered thereby (as will be discussed in more detail below). A given sub-channel may, therefore, be a fraction (e.g., ¼, ⅛, 1/16) of the downstream channel. A subscriber terminal 130 may be configured to filter a frame, demodulating and decoding payload data 720 only if the sub-channel identifier in the signaling data 715 matches one or more sub-channels for the terminal.

Figure 8:
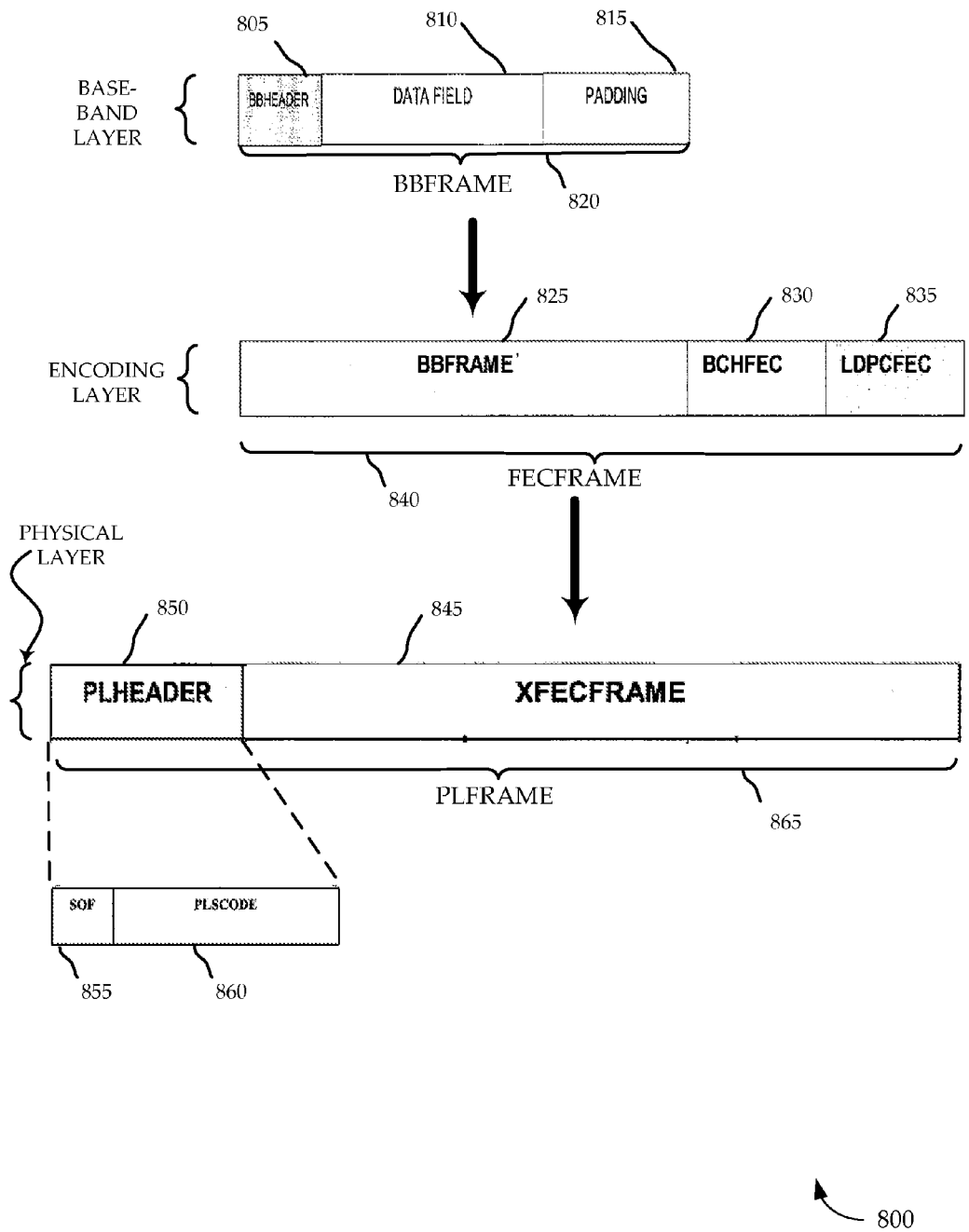
FIG. 8 is a block diagram of a modified digital video broadcast format according to various embodiments of the invention.

Turning to FIG. 8, the framing format 800 for a frame of a modified DVB-S2 system is set forth to illustrate various aspects of the invention. The DVB-S2 frame format may be modified and used in the following manner to implement the frame format 700 described with reference to FIG. 7. It is worth noting that in other embodiments, DVB-S, DVB-S2, WiMax, or other standards may be used, and this modified DVB-S2 format is for purposes of example only.

In one embodiment, each frame is broadcast downstream to all subscriber terminals 130, but is only directed (e.g., using the sub-channel identifier and addressing label) at a select subscriber terminal 130 (or small groups of terminals). For example, the waveform may be a single carrier waveform transmitted downstream from a gateway 115 to a subscriber terminal 130 in the system 100 of FIG. 1. As noted above, while the DVB-S2 system is used as an example, the principles specified herein are applicable to a range of systems.

The header identifier 710 of FIG. 7 may be implemented as the Start of Frame (SOF) 855 of FIG. 8, and the signaling data 715 may be implemented as a modified Physical Layer Signaling code (PLSCODE) 860. The SOF 855 is a known 26-symbol pattern. The PLSCODE is a 64-bit linear binary code, which conveys seven bits of information. In total, the SOF 855 and PLSCODE 860 occupy 90 symbols. In one embodiment, the format for the PLSCODE 860 is modified from the DVB-S2 standard so that the seven bits carried inform receivers about the modcode (4 bits) and provide sub-channel identifier information (3 bits). In other embodiments, other formats are possible, with signaling data 715 of different sizes and formats. The PLSCODE 860 may be protected by a very low rate code to ensure that it can be read correctly even in very poor SNR conditions.

The baseband frame 820 of FIG. 8 is made up of a baseband header 805, a data field 810, and padding 815. Data in the data field may, for example, include one or more stream encapsulation headers, each appended to one or more IP packets. The data field 810 may include a number of stream encapsulation headers, each with an address label (e.g., the data link layer address or shortened identifier) indicating the terminal or terminals (within the sub-channel) to which the packet will be directed. Packets associated with the same modcodes will typically be transmitted in the same baseband frame 820, although they may be combined for packing efficiency. The DVB-S2 specification provides that certain frames will be of fixed size regardless of the modcode used (i.e., a normal FEC frame is 64,800 bits, and a shortened FEC frame is 16,200 bits), leading to frames with different time durations. However, in some embodiments, frame size may be varied according to the modcode selected for the frame, to thereby produce frames of uniform duration in time.

Interleaving and FEC encoding (e.g., BCH and LDCP) may then be performed on the baseband frame 820. This produces a FEC Frame 840, made up of an encoded baseband frame 825 with outer coding parity bits 830 and inner coding parity bits 835 appended. While, as noted above, the DVB-S2 specification provides that the FEC frame 840 will be of fixed data size, in other embodiments, the FEC frame 840 size may vary according to the modcode selected for the frame, to thereby produce frames of substantially uniform duration in time.

The FEC frame 840 is bit mapped to the applicable constellation (e.g., QPSK, 8PSK, 16APSK, 32APSK) to produce a XFEC frame 845. The XFEC frame 845 may be the payload data 720 of FIG. 7. A PL header 850 is added to the XFEC frame 845, together forming the PL frame 865. The PL header 850 (which may be the header 705 of FIG. 7) is formatted as described above and encoded. The PL frame 865 is then baseband shaped and quadrature modulated, as well as amplified and upconverted to be transmitted downstream.

In one embodiment, PL frames 865 (and, thus, each corresponding baseband frame 820 encapsulated therein) are mapped one-for-one for each sub-channel. Thus, it will be worthwhile to introduce certain principles related to sub-channel assignment and allocation. Consider that gateway 115 has received and encapsulated data destined for a subscriber terminal 130. For purposes of discussion, a set of frames for transmission to a particular subscriber terminal 130 receiving a first sub-channel are designated ($PLF1_a$, $PLF1_b$, $PLF1_c$, . . . $PLF1_n$). Assume that there are eight sub-channels. In one embodiment, a round-robin technique is used where a first frame ($PLF1_a$) is mapped to the first sub-channel, a second frame (not destined for the terminal) is mapped to a second-sub channel, and so on up to an eighth frame for an eighth sub-channel. The second frame destined for the terminal ($PLF1_b$) is then mapped to the first sub-channel, and the round-robin format proceeds (i.e., $PLF1_c$, . . . $PLF1_n$ are each mapped to the first sub-channel in succession after each round). In this embodiment, each sub-channel corresponds to a set of subscriber terminals 130.

A number of other techniques of mapping frames to sub-channels may be used as well. For example, instead of a round-robin format, the sub-channel identifiers may be appended without the recurring order (e.g., based on the bandwidth requirements, or QoS, of the terminals for the sub-channel). Thus, allocation and assignment of sub-channels may be varied dynamically (e.g., a given sub-channel identifier could be used for a number of consecutive frames, or the allocation to a given sub-channel may be greater that other sub-channels). A number of hybrid schemes are possible as well, as is evident to those skilled in the art, and thus a variety of multiplexing techniques may be used at the gateway.

Figure 9:
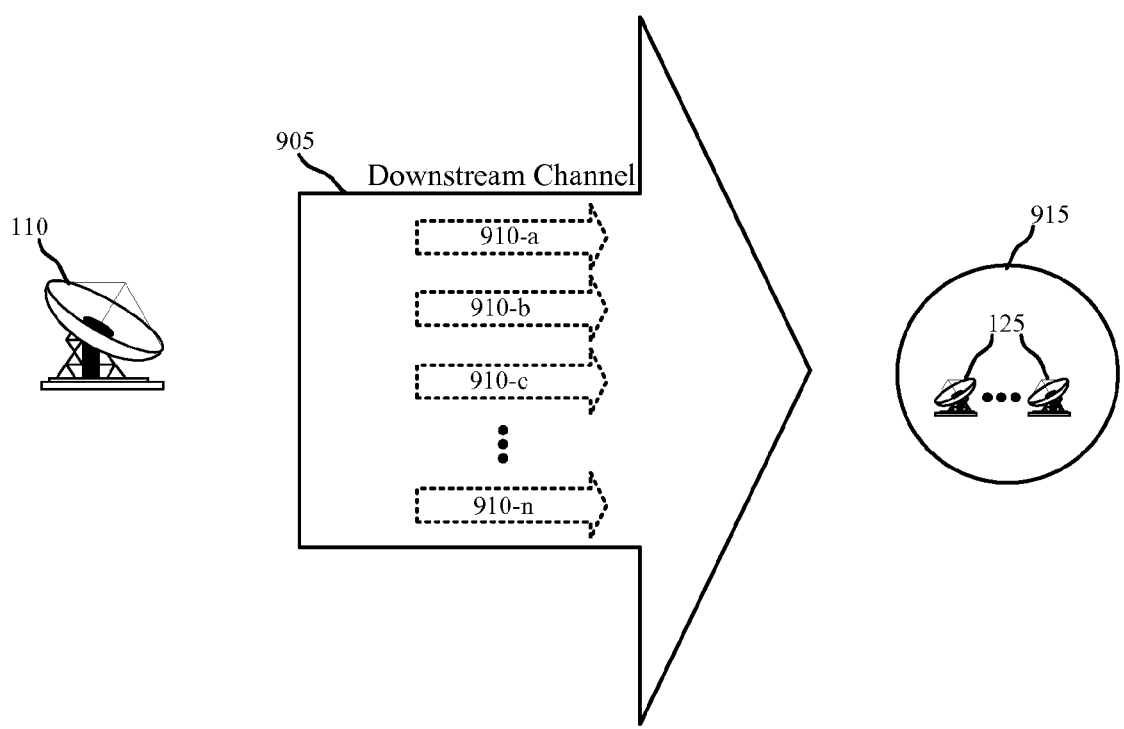
FIG. 9 is a channel diagram of a downstream channel diagram according to various embodiments of the invention.

Referring next to FIG. 9, a forward channel diagram 900 illustrating the sub-channel structure is shown for an embodiment of the invention. The illustrated channel 905 goes from a gateway antenna 110 to the subscriber terminal antennas 125 in a service beam area 915. The forward channel 905 operates at approximately 500 Mbps in this embodiment such that a service beam area 915 receives that bandwidth, but in other embodiments could be at or above 100 Mbps, 250 Mbps, 750 Mbps, 1 Gbps, or 1.5 Gbps. A single carrier is used for transporting the forward channel 905, but other embodiments could use multiple carriers. The subscriber terminal 130 for this embodiment tracks at full rate (e.g., 500 Mbps), but does not completely demodulate and decode at full rate. Full demodulation and decoding only occurs for assigned sub-channels 910 in the forward channel 905.

In this embodiment, the forward channel 905 is shown as an arrow encapsulating n dashed arrows, which are the n sub-channels 910. The sub-channels 910 may each be portions of the superframe. In one embodiment, the duration in time of the superframe does not change, but the size of the superframe varies in other embodiments. A recurring block size for each frame of a sub-channel 910 may be the same, or frames may vary in number and size. Some embodiments do not use superframes, but simply have sub-channels that are addressed to sets of subscriber terminals 130.

Subscriber terminals 130 may be configured to be capable of processing different amounts of the forward channel 905. Some embodiments of the subscriber terminal 130 may be configured to process at 1/16 datarate, 1/8 datarate, 1/4 datarate, 1/2 datarate, full speed, or any other fraction of the full data rate. In some cases, the subscriber terminal 130 may be configured to be incapable of running beyond a specified fraction of the full rate or artificially capped even though capable of faster speeds.

Figure 10A:
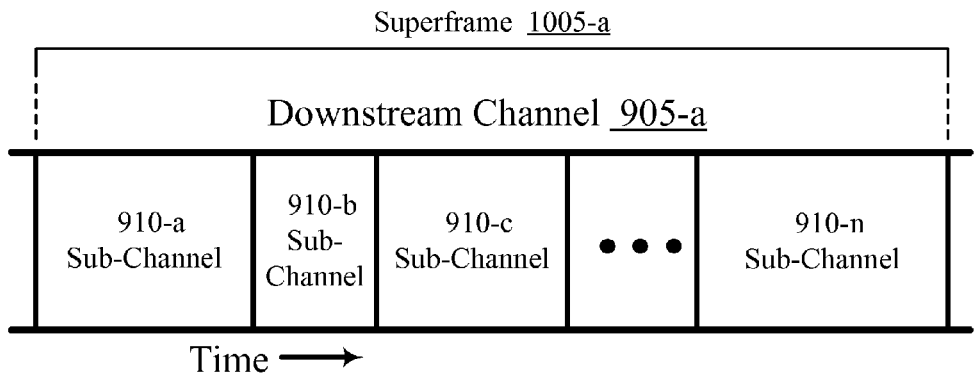
FIGS. 10A-10C are diagrams of various channel and subchannel structures formatted according to embodiments of the invention.
Figure 10B:
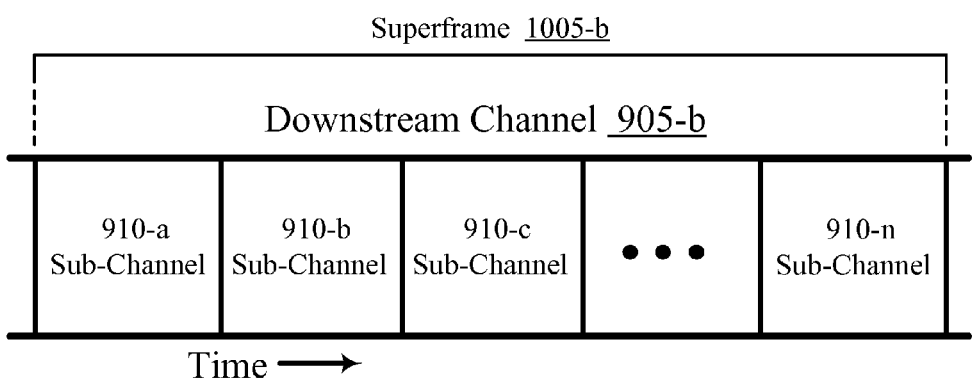
Figure 10C:
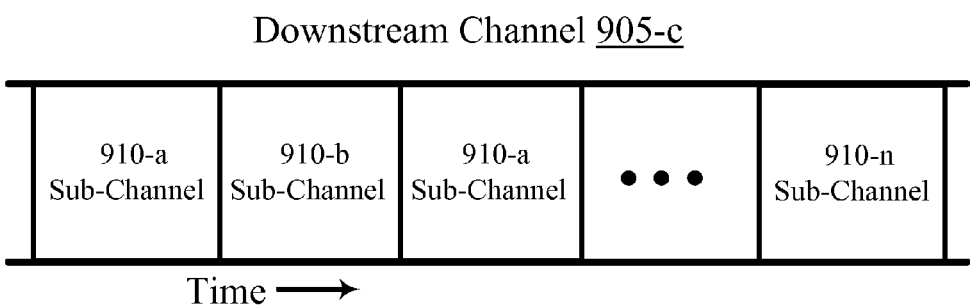

FIGS. 10A-10C illustrate various options for different embodiments of the channel 905. Referring first to FIG. 10A, an embodiment of a downstream channel 905-a is shown. This embodiment uses sub-channels 910 of a uniform block size in each superframe 1005-a, and because of ACM, the duration in time of each sub-channel (and thus each frame) may vary. Thus, although the duration in time of each superframe will often vary in this embodiment, the number of frames and order of frames within each superframe will be constant.

Referring next to FIG. 10B, an alternative embodiment of a downstream channel 905-b is shown. This embodiment uses sub-channels 910 of a varied block size in each superframe 1005-b, adapting block size in light of the applicable modcode, to produce sub-channels (and frames) of substantially uniform duration in time. Thus, the data size of each superframe will likely vary in this embodiment, but the number of frames per superframe 1005-b and the order of sub-channels within each superframe 1005-b will be constant. In other embodiments, a superframe 1005 could be of constant duration in time, and the number of frames per superframe 1005 and order of sub-channels within each superframe 1005 could vary.

Referring next to FIG. 10C, an alternative embodiment of a downstream channel 905-c is shown. This embodiment uses sub-channels 910 of a varied block size, adapting block size in light of the applicable modcode, to produce frames of substantially uniform duration in time. However, in this embodiment, there is no superframe, and the order of sub-channels 910 may vary. In one embodiment, the sub-channels may be in any order. In other embodiments, the system could be set to have certain time slots for selected sub-channels, or have individual sub-channels not repeat more often than a certain threshold (e.g., more than 1 in 2, or 1 in 3 frames).

Figure 11A:
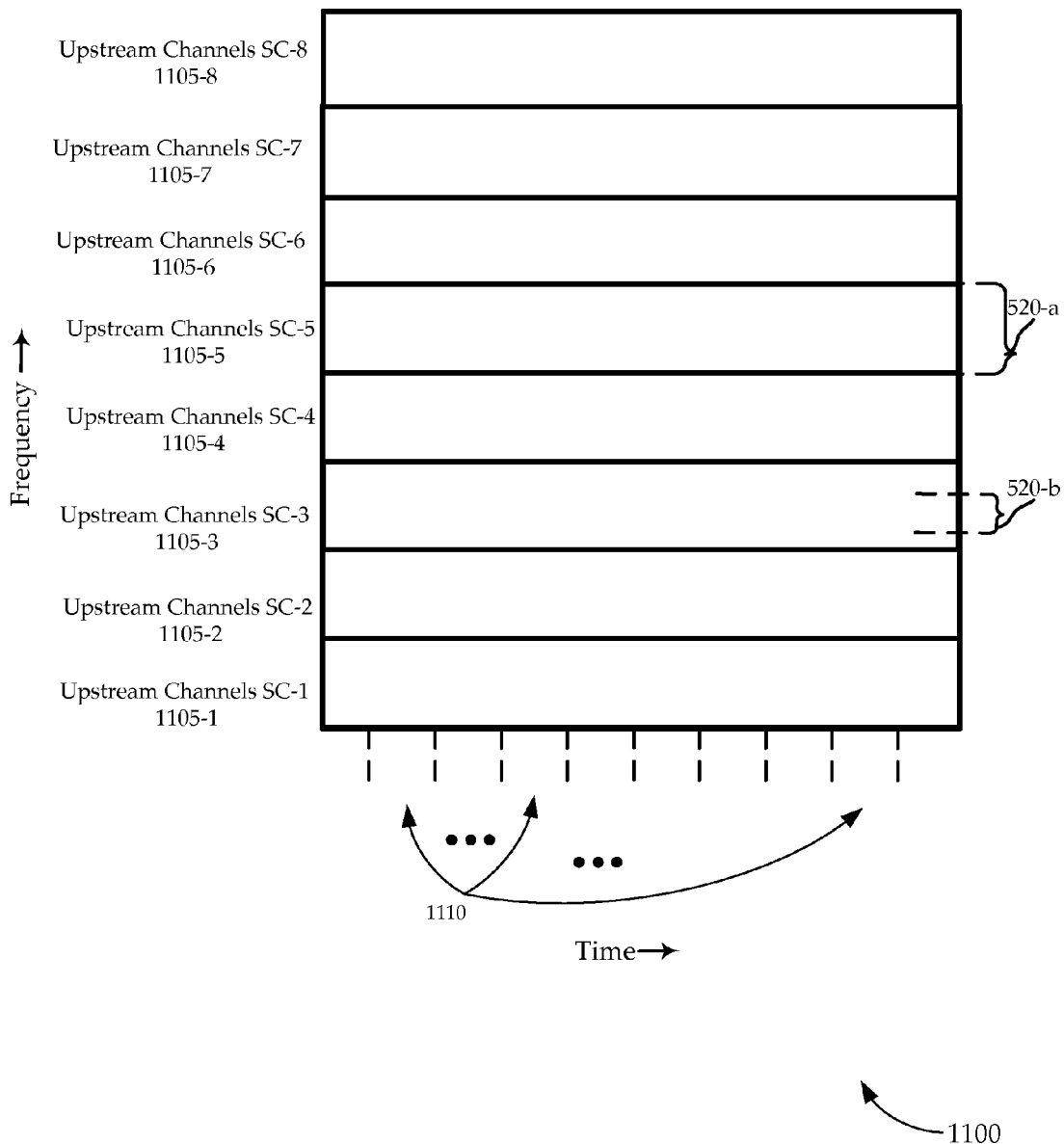
FIGS. 11A and 11B are block diagrams illustrating alternative chanelization strictures according to various embodiments of the invention.

Turning to FIG. 11A, a diagram 1100 illustrating a number of sets of upstream frequency channels 1105 is shown. In this embodiment, assume that a gateway 115 of FIG. 1 is transmitting eight downstream sub-channels, such as the sub-channels 910 discussed with reference to FIGS. 9 and 10A-10C. In the illustrated embodiment, sets of adjacent frequency channels 1105 (e.g., in an MF-TDMA system) are allocated for upstream communications based on the sub-channel identifier associated with the respective subscriber terminals 130. Thus, in one embodiment, each of the subscriber terminals 130 associated with a given sub-channel may share a set of upstream frequency channels 1105 (e.g., set 1105-1, set 1105-2, etc.). Time slots 1110 may be allocated to each of the subscriber terminals 130 for their use in assigning upstream traffic.

The range of a DCO (e.g., DCO 635 of FIG. 6) at a subscriber terminal 130, and perhaps other factors discussed above, may limit the frequency hopping for a subscriber terminal to a narrower range 520-b of upstream channels. Thus, the analog frequency synthesizer (e.g., analog frequency synthesizer 640 of FIG. 6) at different subscriber terminals 130 may be directed to locate the initial frequency at different locations within a given set of upstream frequency channels 1105. In one embodiment, this may allow better utilization of each set of upstream frequency channels 1105 associated with a given sub-channel.

Figure 11B:
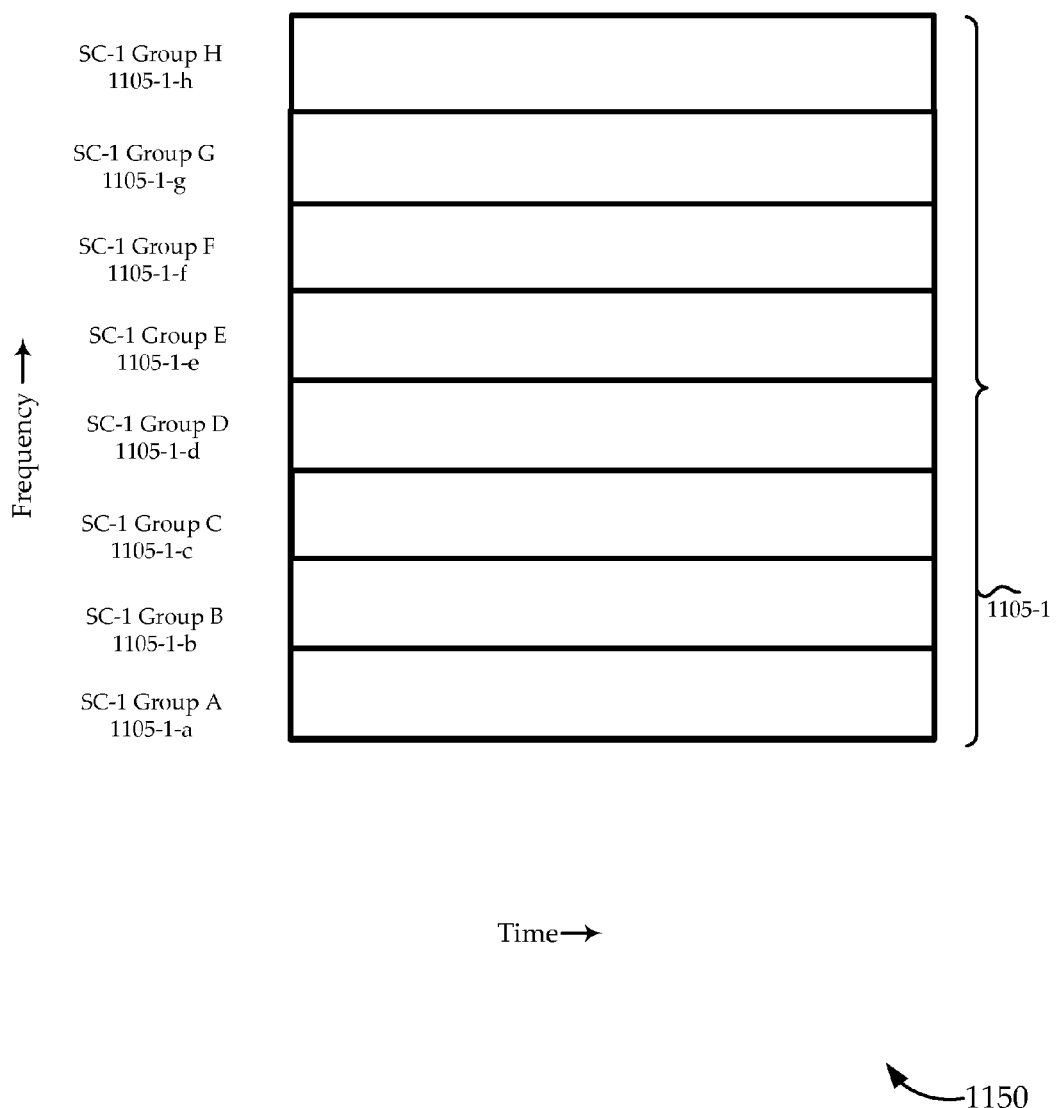

In other embodiments, the range of a DCO (e.g., DCO 635 of FIG. 6) at a subscriber terminal 130, and perhaps other factors discussed above, may limit the frequency hopping to a range 520-a of upstream channels that covers the entire set of upstream channels 1105-1 for a sub-channel. Turning to FIG. 11B, a diagram 1150 is shown illustrating a number of groups of upstream frequency channels 1105-1-a to 1105-1-h, showing an example composition of the set of upstream frequency channels 1105-1. Each group is for the use of the subscriber terminals associated with sub-channel one. In this embodiment, the groups may each be allocated to certain subsets of subscriber terminals 130 based on addresses (e.g., MAC addresses in a first range in Group A 1105-1-a, MAC addresses in a second range in Group B 1105-1-b, etc.). Such groups may be set, for example, based on ranges of a DCO or other factors set forth above.

It is worth noting it may be desirable to have upstream traffic across sub-channels be relatively equal to maximize packing efficiency. Therefore, subscriber terminals 130 associated with different sub-channels may be swapped or changed to balance loads across sets of upstream channels (e.g., sets 1105-1 to 1105-8) or groups (e.g., groups 1105-1-a to 1105-1-h). Alternatively, widths of sets of channels (e.g., of channels 1105-1 to 1105-8) may be modified to balance such loads.

Figure 12A:
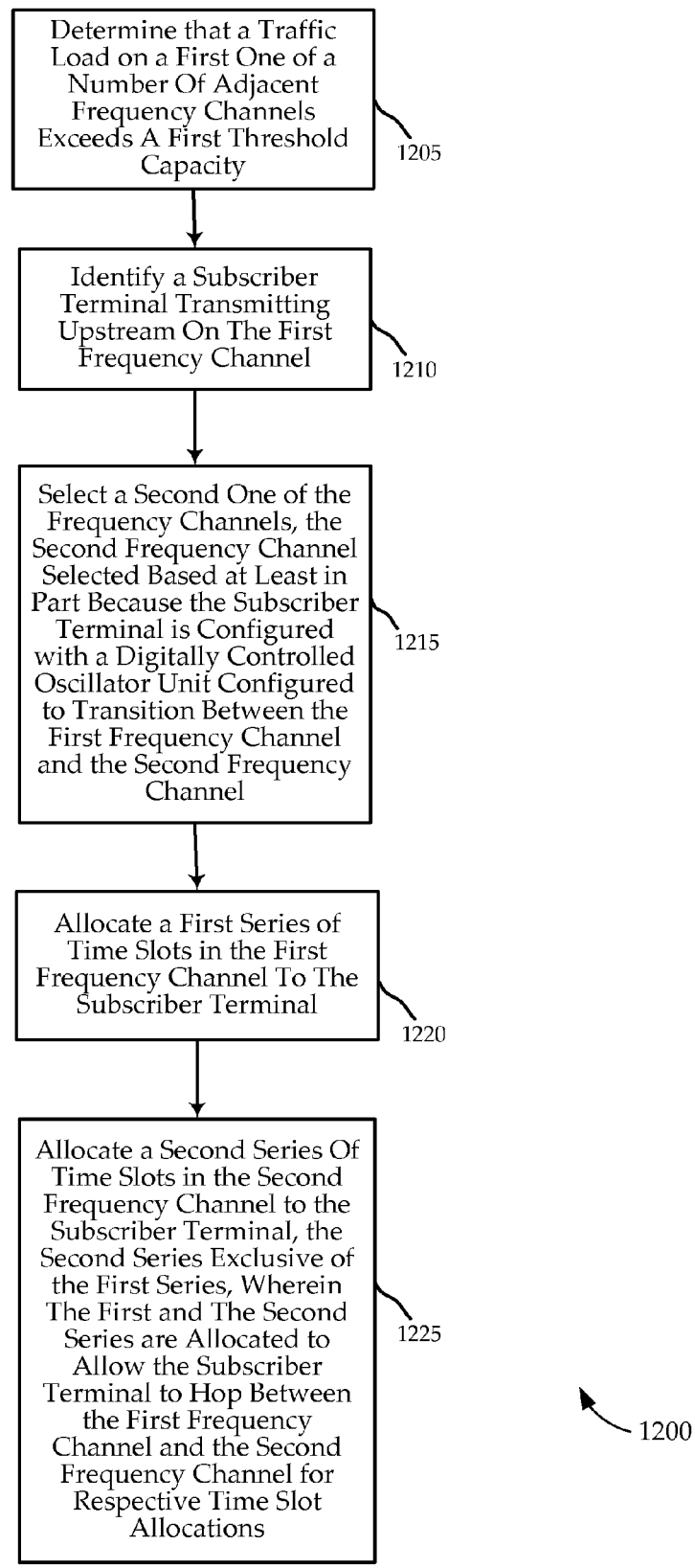
FIG. 12A is a flow diagram illustrating the allocation of time slots across different frequency channels according to various embodiments of the invention.

Referring next to FIG. 12A, a flowchart is shown illustrating a method 1200 for allocating time slots to allow frequency hopping on wireless upstream signals. The method may be performed, for example, in whole or in part, by the gateway 115 described with reference to FIG. 1, 2, or 4.

At block 1205, a determination is made that a traffic load on a first one of a number of adjacent frequency channels exceeds a first threshold capacity. At block 1210, a subscriber terminal transmitting upstream on the first frequency channel is identified. The subscriber terminal may be identified because it has requested additional capacity, or for other reasons as well. At block 1215, a second one of the frequency channels is selected at least in part because the identified subscriber terminal is configured with a digitally controlled oscillator unit configured to transition between the first frequency channel and the second frequency channel.

In other embodiments, the second one of the frequency channels may be identified and/or allocated based on any of the following: 1) whether the channel may be transitioned to digitally within the transitional time period; 2) whether the transition to the channel may be performed coherently; 3) how close the channel is from the currently allocated channel; 4) whether the channel has capacity, and how much capacity is available; 5) whether the channels surrounding the channel have capacity, and how much capacity is available; 6) what the settling time is for the channel; and 7) options for future digital transitioning, etc. A number of these factors may be accorded different weights, and a determination of the frequency hopping channels may be made based thereon.

At block 1220, a first series of time slots is allocated to the subscriber terminal in the first frequency channel. At block 1225, a second series of time slots is allocated to the subscriber terminal in the second frequency channel, the second series exclusive of the first series. The first and the second series are allocated to allow the subscriber terminal to hop between the first frequency channel and the second frequency channel for respective time slot allocations.

Figure 12B:
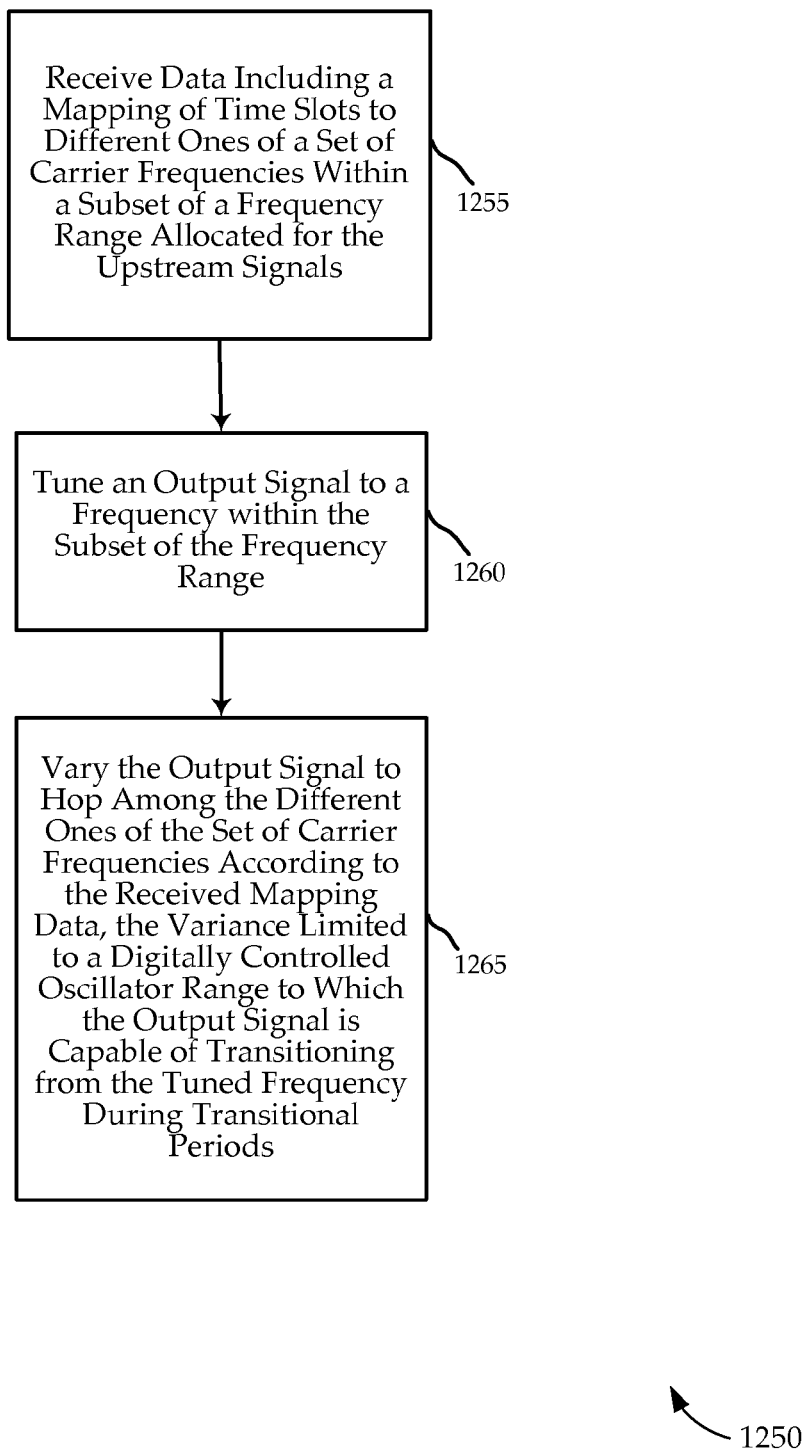
FIG. 12B is a flow diagram illustrating frequency hopping across different carrier frequencies according to various embodiments of the invention.

Referring next to FIG. 12B, a flowchart is shown illustrating a method 1250 of frequency hopping on wireless upstream signals. The method may be performed, for example, in whole or in part, by the subscriber terminal described with reference to FIG. 1 or 6.

At block 1255, mapping data is received, including a mapping of time slots to different ones of a set of carrier frequencies within a subset of a frequency range allocated for upstream satellite signals. This mapping, for example, may be the first and second set of time slot allocations performed in block 1220 and block 1225, then transmitted from a gateway to a terminal. Thus, in such an embodiment, the carrier frequencies may each be associated with a frequency channel. At block 1260, an output signal is tuned to a frequency within the subset of the frequency range. At block 1265, the output signal is controlled to hop among the different ones of the set of carrier frequencies according to the received mapping data, the variance limited to a digitally controlled oscillator range to which the output signal is capable of transitioning from the tuned frequency during transitional periods.

II. Prioritized Upstream Resource Allocation: In another set of embodiments, systems, devices, and methods are described for prioritized upstream resource allocation and traffic assignments. The following embodiments may be implemented using a variety of transmission techniques for the upstream service links 145 and feeder links 140 from the subscriber terminals 130 of the system 100 of FIG. 1. For example, the DVB-S or DVB-S2 standards may be used in any manner known in the art. More specifically, a MF-TDMA technique may be used, such as the MF-TDMA scheme set forth in the DVB-RCS standard. Either a fixed-slot or dynamic slot MF-TDMA system may be used. Alternatively, these or other standards may be modified in accordance with one or more of the principles described below. For example, the DVB-RCS standard and other upstream transmission techniques utilizing MF-TDMA may be modified to provide the scheduling mechanisms described herein for upstream resource optimization.

Figure 13:
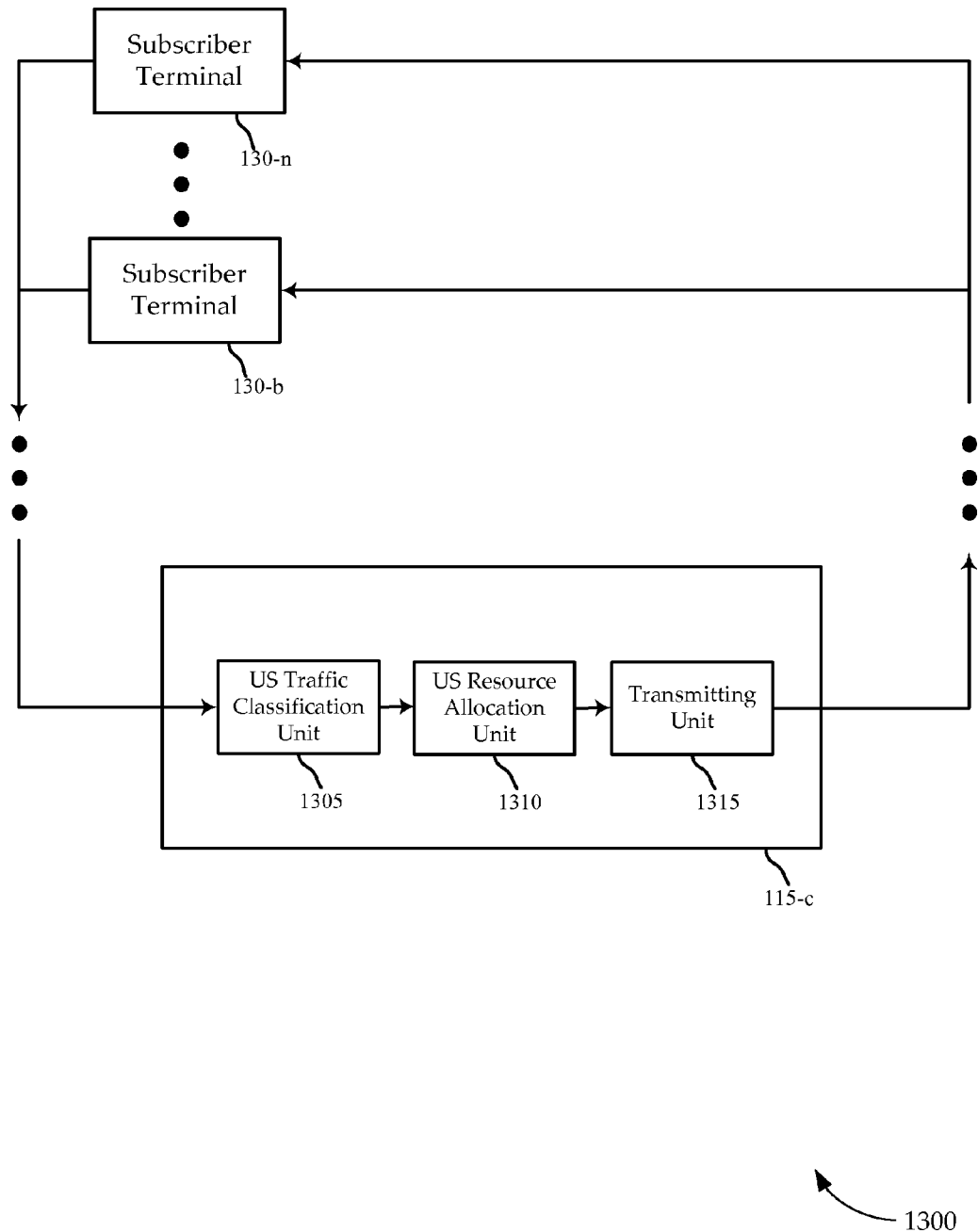
FIG. 13 is a block diagram of a gateway device configured according to various embodiments of the invention.

Referring next to FIG. 13, an example embodiment is shown of a system 1300 with a gateway 115-c in communication with a number of subscriber terminals 130. This may be the gateway 115 of FIG. 1, and various aspects of FIG. 1 will be used in describing the functionality of this gateway 115-c. The gateway 115-c may be configured to allocate time slots on different upstream frequency channels in a prioritized manner. Subscriber terminals may receive the allocation, and control the assignment of their upstream traffic to the time slots.

In one embodiment, the gateway 115-c includes an upstream traffic classification unit 1305, an upstream resource allocation unit 1310, and a transmitting unit 1315, each of which may be in communication with each other directly or indirectly. In some embodiments, a device may include only a subset of these units, or may include additional units. The units of the device 115-c may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. The units and functionality of the device 115-c may be integrated with the units and functionality of the device 115-b described with reference to FIG. 4 (e.g., the traffic classification unit 1305 may be integrated with the receiving unit 405, and the upstream resource allocation unit 1310 may be integrated with the monitoring unit 410 and/or the scheduling unit 415).

Consider, for purposes of example, an MF-TDMA scheme in which a subscriber terminal 130 transmits signals upstream to a gateway 115 via a satellite 105 using one of a set of carrier frequencies. The frequency range available for transmission is divided up into a series of frequency channels, and the subscriber terminal 130 may change its carrier frequency to transmit on the different channels. The bandwidth for each frequency channel may be fixed or variable, and the channel size may be the same or different bandwidths. The bandwidth of a given channel may vary dynamically with time. Also, it is worth noting that while certain frequency ranges may be allocated for MF-TDMA use, other bands may be available for upstream use on a contention basis. For example, upstream resource request messages from a subscriber terminal in DOCSIS environments may be made on a contention channel. Within a given frequency channel, a subscriber terminal 130 may be given certain time slots for transmission.

In order to allocate frequency channels and time slices in such an MF-TDMA environment, a gateway 115-c may allocate the available slots, and broadcast this control information downstream to subscriber terminals 130 (e.g., with modified DOCSIS MAP messages). In other embodiments, different gateway 115 configurations or components may perform some or all of this functionality. It is also worth noting that while MAP messages are discussed, embodiments of the invention are applicable in a number of different systems and non-MF-TDMA environments.

The traffic classification unit 1305 may be configured to receive a variety of information from the subscriber terminals 130 (via the satellite 105). This information may, for example, include log-in information and signal quality measurements, in addition to service, bandwidth, and other resource requests. The resource request messages from subscriber terminal 130 may, in some embodiments, be piggybacked on data transmissions. Thus, resource request messages may be separate control messages, or implied or interpreted messages from particular streams. This information may be transmitted from the subscriber terminals 130 to the gateway 115 via the upstream links 140, 145. The upstream links 140, 145 may be made up of a number of adjacent frequency channels allocated for upstream satellite communications, wherein time slots on different channels are allocated to particular subscriber terminals 130. Alternatively, information may be received from one or more devices on the network 120 that compile information passed from the subscriber terminals 130 or other sources.

A number of mechanisms may be used to signal capacity requests, including a modified DOCSIS request or modified RSVP request, adapted for use in the system 100 according to the parameters included herein. The messages may include an indication of the rate and/or duration of requested transmissions, along with the type of traffic involved in the transmission. A single subscriber terminal 130 may request more than one stream (e.g., sending multiple messages). Thus, different streams from a single subscriber terminal 130 may receive different allocations.

This traffic type information may be indicated in a variety of ways, as known in the art. In one embodiment, the type of traffic is indicated by whether the transport protocol is TCP or UDP. Various protocols also include "type" fields which characterize the traffic. Alternatively, port numbers, IP addresses, and protocols may be used to identify types of traffic. A number of alternative options are available, as evident to those skilled in the art. In addition to the type indication, the packet may also include additional class of service (CoS)/quality of service (QoS) parameters. The time period(s) for allocating time slots for a given set of requests may be set by various units of the gateway 115-c, or may be otherwise received.

The upstream traffic classification unit 1305 may, using the resource request messages, identify and/or classify the traffic into categories. For example, in one embodiment, the requested allocations are classified as prioritized traffic or non-prioritized traffic. This identifications and/or classifications may be based, in whole or in part, on a determination that the transmission specifications limiting latency and packet spacing variance for certain traffic exceed a threshold level.

The transmission specifications may be looked up based on traffic type, or may be specifically included in the request. These transmission specifications may include latency, jitter, rate, packet size, packet spacing, requested duration, and other requirements of the identified traffic categories and/or types, in light of the satellite link at issue. Satellite links have intrinsic delay, including propagation delay on the uplink and downlink for the upstream request message, the propagation delay on the uplink and downlink for the downstream response allocation message, and the propagation delay on the uplink and downlink for the upstream transmission, in addition to processing time. For interactive services, therefore, reducing latency and jitter may be of increased importance.

As noted, the identification and/or classification may be based, in whole or in part, on a determination that transmission specifications limiting latency and packet spacing variance exceed a threshold level. Various interactive services, such as VoIP, conferencing, interactive multimedia services, and so on, may be classified as prioritized traffic. The threshold for latency may be a set delay or latency threshold, or may be implemented by identifying a maximum packet size. The threshold for the packet spacing variance may also be implemented as a jitter limit, or a substantially equidistant spacing requirement between each of a series of packets. It is also worth noting that the identified traffic may be classified as prioritized traffic in a number of different ways (e.g., using other methods and levels of classification).

Traditional web traffic, document transfers, software downloads, and certain streaming services will in many instances not meet the threshold. This traffic may remain without a classification, or may be associated with intermediate levels of classification.

The capacity requests, transmission specifications, and identifications/classifications for prioritized traffic are then processed by the upstream resource allocation unit 1310. Assume that, in this embodiment, traffic is classified as prioritized traffic or non-prioritized traffic. The upstream resource allocation unit 1310 first allocates resources to the prioritized traffic according to the transmission specifications, identifying sets of time and frequency slots for each stream. For circuit emulation voice traffic, for example, slot assignment may be directed at spreading voice packets across a number of small bursts (e.g., each packet containing a 10 ms, or 20 ms, sample). Also, the packets may be regularly spaced in time (e.g., to allow for transmission of each packet as soon as possible after it is encapsulated, to minimize delay/latency).

In one embodiment, the upstream resource allocation unit 1310 identifies certain frequency channels for prioritized traffic, and this allocation may exclude non-prioritized traffic. In another embodiment, the upstream resource allocation unit 1310 attempts to first identify and fill certain frequency channels with prioritized traffic that has certain like spacing requirements, and then allocates some of the remaining spaces in the channel to non-prioritized traffic.

Preference may be also given to keeping a subscriber terminal 130 on the same channel or group of channels for all types of traffic. In allocating non-prioritized traffic, the upstream resource allocation unit 1310 may, therefore, give preference to traffic of a first subscriber terminal 130 if the frequency channel(s) includes the prioritized traffic of the first subscriber terminal 130. The upstream resource allocation unit 1310 may, in other embodiments, exclude other subscriber terminals 130 not associated with prioritized traffic of frequency channel(s) allocated to that prioritized traffic. Preference may be given to keeping streams of a subscriber terminal 130 allocated to adjacent channels, or certain ranges of channels, perhaps including the frequency hopping range considerations discussed above. This resource allocation may be characterized as adaptive mapping, dynamically selecting available frequency and time slots first for prioritized traffic. Predictions based on current traffic composition and capacity levels may be used to implement predictive scheduling techniques. Therefore, the upstream resource allocation unit 1310 may also specify a duration period extending outside the current allocation period to each latency-sensitive stream.

After allocating the time slots in the frequency channel(s) to the prioritized traffic, upstream resource allocation unit 1310 allocates some or all of the remainder of the traffic on a capacity-available basis. Various queuing configurations may be utilized to give preference to streams with longer pending requests. Preference may also be granted to traffic with certain QoS levels. By first dynamically allocating time slots to the prioritized traffic, and then dynamically allocating the remainder, available upstream traffic may be more efficiently allocated in some embodiments.

The upstream resource allocation unit 1310 then translates these frequency channel and time slot allocations into a frame composition message for each subscriber terminal 130. This frame composition message is a generalized block of time slots for the time period to be used as determined by (or under the control of) a subscriber terminal 130. A transmitting unit 1315 then broadcasts the message downstream to the respective subscriber terminals 130. This frame composition message contains the channel and time allocations for a given allocation period. Each subscriber terminal may then use the frame composition message to determine the channel and time slots for each of its stream requests.

While the above discussion assumes that traffic is classified as prioritized traffic or non-prioritized traffic, the classification scheme may be parsed further. For example, with latency-sensitive traffic, applications may be further classified as constant bit rate services (e.g., certain voice applications, such as circuit emulation voice), or variable bit rate services. Constant bit rate services may be associated with services with relatively stable, consistent demand, whereas variable bit rate services are associated with uneven demand. If latency-sensitive packets are divided among constant and variable bit rate services, the allocation unit may be configured to allocate time/frequency slots to the constant bit rate services first, then to the variable bit rate services. Certain QoS parameters attributed to certain streams may also dictate one or more streams be allocated before others.

Figure 14A:
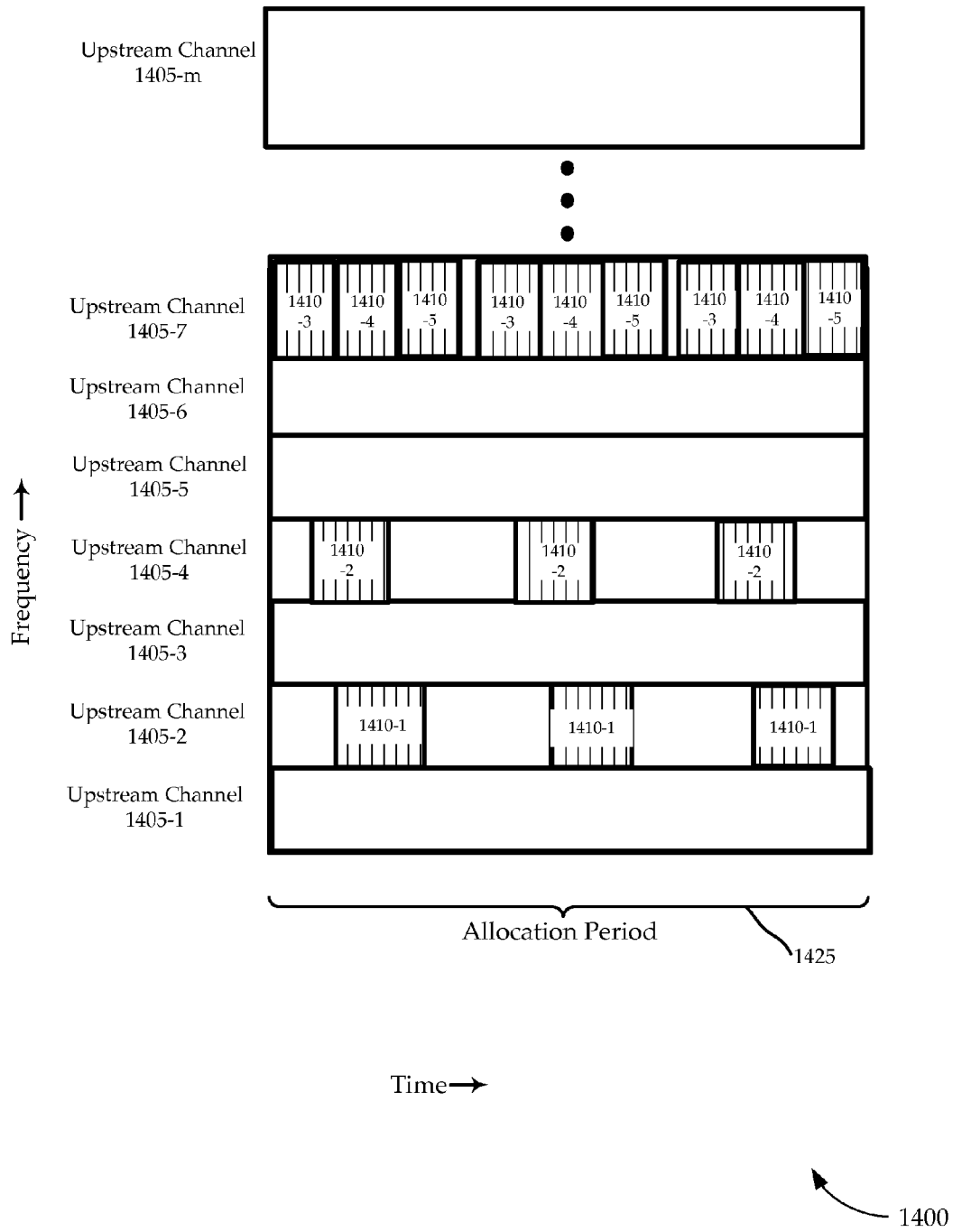
FIGS. 14A-14B are block diagrams illustrating an upstream channel allocation according to various embodiments of the invention.

Turning to FIG. 14A, a diagram 1400 illustrating a set of upstream frequency channels 1405 is shown. Each upstream frequency channel 1405-1 to 1405-$m$ may be an upstream channel 505 as described for FIG. 5. The set of upstream frequency channels may be a set (set 1105-1, set 1105-2, etc.) as described with reference to FIG. 11A. The embodiment illustrated in FIG. 14A is an example allocation of channel time slots. An upstream resource allocation unit 1310 of the gateway 115-$c$ of FIG. 13, for example, may be configured to allocate time slots to different subscriber terminal 130 streams over an allocation period 1425. Certain stream requests are identified as prioritized traffic, and other stream requests are identified as non-prioritized traffic. Time slots for streams are first allocated to the prioritized traffic: a stream from a first subscriber terminal 130 is allocated time slots 1410-1 in a first upstream channel 1405-2, a second stream from a second subscriber terminal 130 is allocated time slots 1410-2 in a different upstream channel 1405-4, and three additional streams from other subscriber terminals are allocated to time slots 1410-3, 1410-4, 1410-5 in a third upstream channel 1405-7. The upstream resource allocation unit 1310 attempts to identify and fill frequency channel 1405-7 with prioritized traffic streams that have certain like spacing and/or size requirements (e.g., streams allocated to time slots 1410-3, 1410-4, 1410-5 have like spacing requirements). The upstream resource allocation unit 1310 then may allocate some of the remaining spaces in the channel to non-prioritized traffic, if capacity permits.

Figure 14B:
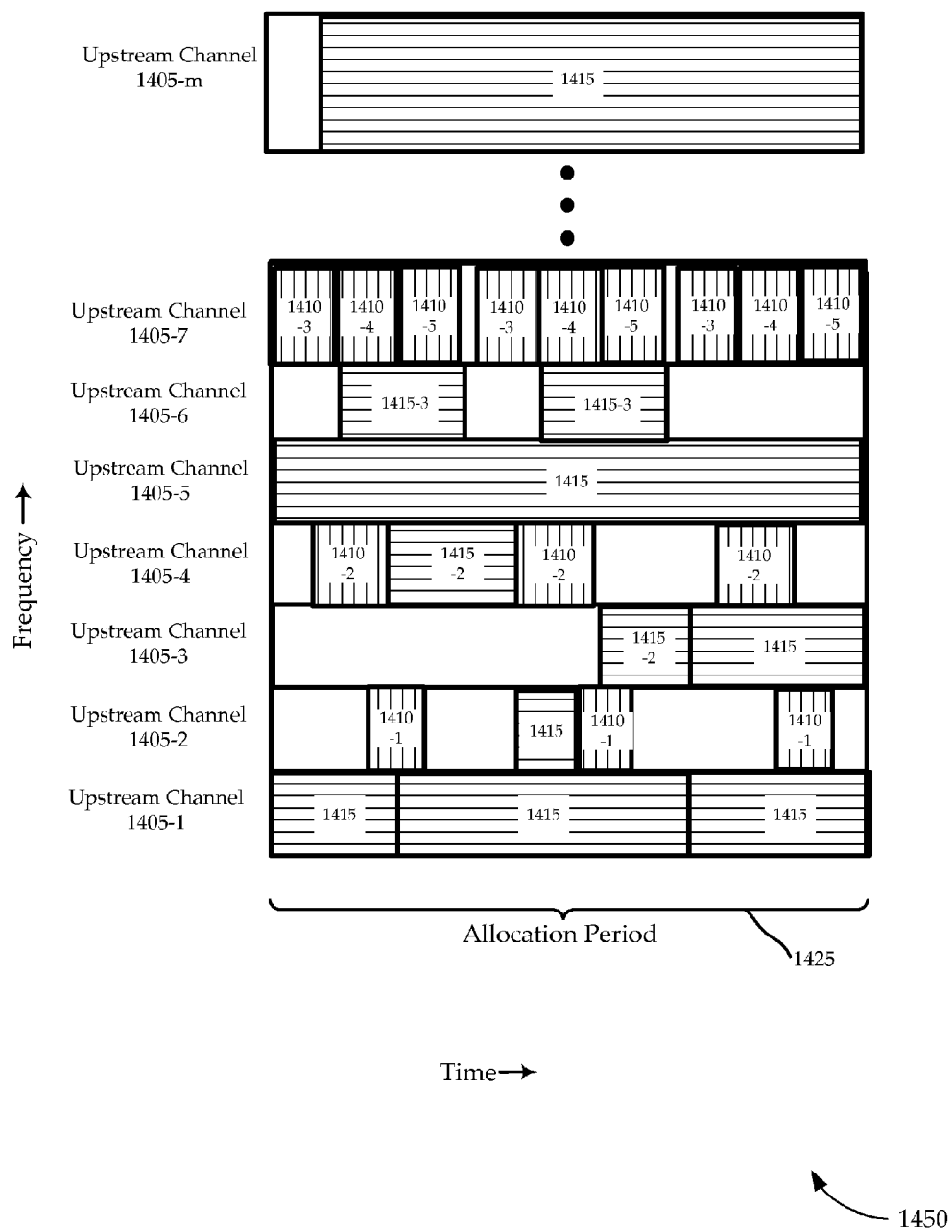

With the allocation of the prioritized traffic completed, the remaining traffic 1415 is allocated to the open time slots as illustrated by the diagram 1450 of FIG. 14B. Channels may be shared with the latency-sensitive traffic in the unallocated time slots of the channels. Also, non-prioritized streams from the second subscriber terminal 130 may be allocated open time slots 1415-2 within or outside the channel 1405-4 carrying the prioritized traffic from that terminal 130. There may, but need not, be a requirement or preference that a channel 1405-4 carrying the prioritized traffic from a subscriber terminal 130 also carry the non-prioritized traffic of the terminal 130. There may also be a requirement or preference that a channel 1405-6 adjacent to a channel 1405-7 carrying prioritized streams from a subscriber terminal 130 also carry the non-prioritized streams of the terminal 130.

The allocation period will, in some embodiments, be contracted to lower latency at the cost of increased use of system resources. Also, there may be different configurations for different allocation periods. For example, in one embodiment, an allocation period may be a longer duration, but control messages may be sent many times within the period. In another embodiment, the upstream resource allocation unit 1310 may map and shape traffic by factoring previous channel time slot allocations into future allocation. A number of other alternatives are available, as well, as evident to those skilled in the art.

In yet another embodiment, rate control functionality may be included in the upstream resource allocation unit 1310, as well. In one such embodiment, the allocation requests attributed to prioritized traffic streams are analyzed to determine whether there is or will be congestion. Then, control messages may be transmitted downstream from gateway 115-*c* the to a subscriber terminal 130 to modify a codec in use, or increase the sample period (e.g., from 10 ms to 20 ms). Similarly, such a change may be implemented for certain audio/video conferencing and other latency-sensitive services, thereby proactively modifying future requests for resource allocation.

In accordance with the above description, the allocation of time slots for a time period may be made up of a block of time slots allocated, but not assigned, to particular streams. A subscriber terminal 130 may be configured to receive the allocation, and then assign its actual traffic dynamically. Turning next to FIG. 15, a block diagram 1500 is shown illustrating certain components of a subscriber terminal 130-*b*, which may be the subscriber terminal 130 of FIG. 1, configured to assign traffic to time slot allocations in a prioritized manner. The subscriber terminal 130-*b* in this embodiment may be in communication with the gateway 115 described with reference to FIG. 1, 2, 4, or 13.

The subscriber terminal 130-*b* in this embodiment includes a resource request unit 1505, an upstream mapping unit 1510, one or more modulator(s) 1515, and a transmitting unit 1520. In some embodiments, a device may include only a subset of these units, or may include additional units. The units of the device 130-*b* may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The resource request unit 1505 of the subscriber terminal 130-*b* may receive data from customer premises equipment 160-*c* or other sources. Using this data, resource request unit 1505 generates capacity requests for each of a number of streams. The capacity requests may be any of the service, bandwidth, and other resource requests received by the upstream classification unit 1305 of FIG. 13. As noted above, the capacity requests may be associated with transmission specifications including limitations on latency and packet spacing variance. Such capacity requests may be encoded and modulated by modulator 1515, and transmitted upstream by the transmitting unit to the gateway 115 via antenna 125-*b*.

In response to the capacity requests, the upstream mapping unit 1510 of the subscriber terminal 130-*b* may receive an allocation of time slots for a time period. The allocation may be a block of time slots unassigned to particular streams, or may otherwise allow the subscriber terminal 130-*b* to determine or otherwise control traffic assignment dynamically. The allocation may be the frame composition message produced by the upstream resource allocation unit 1310 transmitted to the subscriber terminal 130-*b*.

The upstream mapping unit 1510 may then identify and classify at least some of the data traffic to be transmitted in the time period as prioritized subscriber terminal traffic. The classification may be based, in whole or in part, on a determination as to whether transmission specifications include limitations on latency and packet spacing variance that exceed a threshold level. This threshold level may be the same, or different, than the threshold applied by an upstream traffic classification unit 1305 at a gateway 115-*c* transmitting the allocation. For example, if a subscriber terminal 130-*b* wants to transmit a greater amount of traffic than requested or allocated, the threshold may be modified to shape traffic or better ensure that certain high priority traffic is transmitted.

The upstream mapping unit 1510 may then dynamically assign the prioritized subscriber terminal traffic to the allocation in a set of time slots. This assignment may be made because the assigned slots conform with the limitations on latency and/or packet spacing variance. The upstream mapping unit 1510 may assign a set of data traffic to the allocation in the first set of time slots without the resource request unit 1505 first generating a capacity request for the first set of data. The upstream mapping unit 1510 may subsequently assign the data traffic not classified as prioritized subscriber terminal traffic to the time slots remaining in the allocation. In one embodiment, the time slots remaining in the allocation do not conform to the limitations on latency and/or packet spacing variance of the prioritized traffic.

The transmitting unit 1515 may transmit the traffic streams to be transmitted upstream (e.g., from CPE 160-*c* or elsewhere) according to assignments for the first and second set of time slots.

Figure 15A:
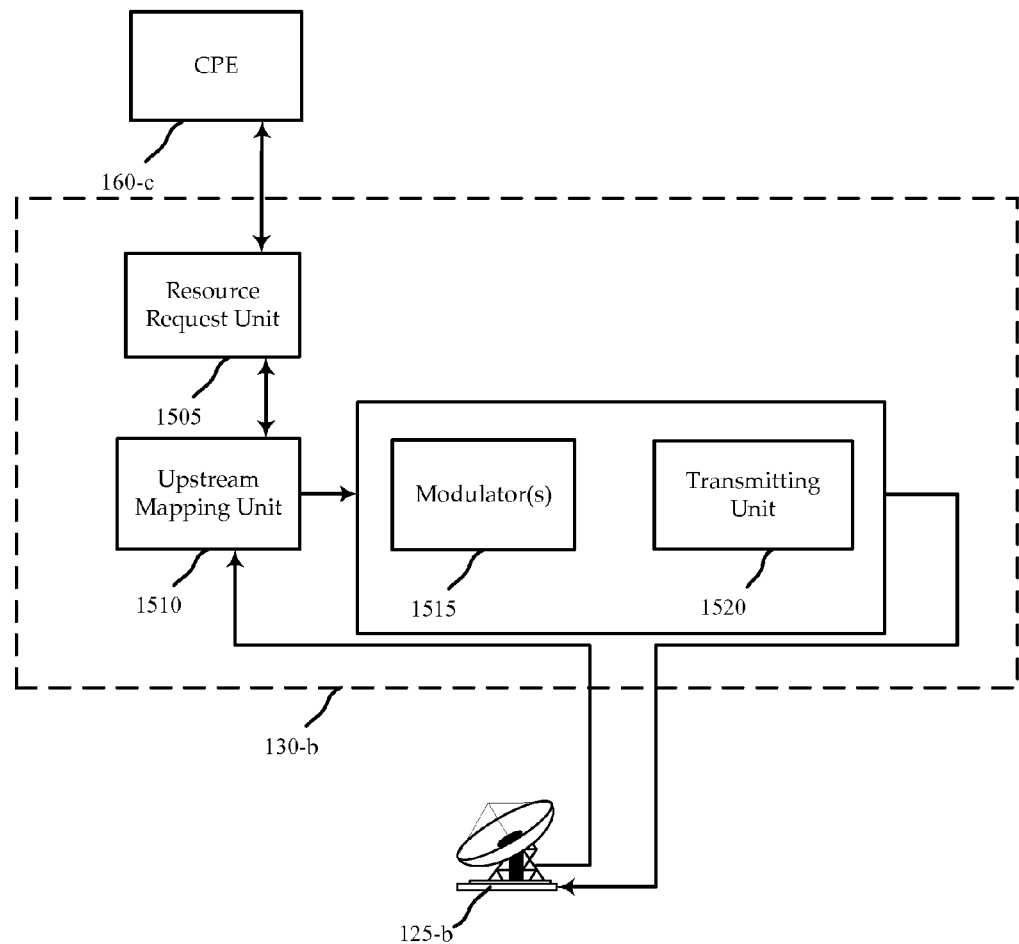
FIG. 15A is a block diagram of a subscriber terminal device configured according to various embodiments of the invention.
Figure 15B:
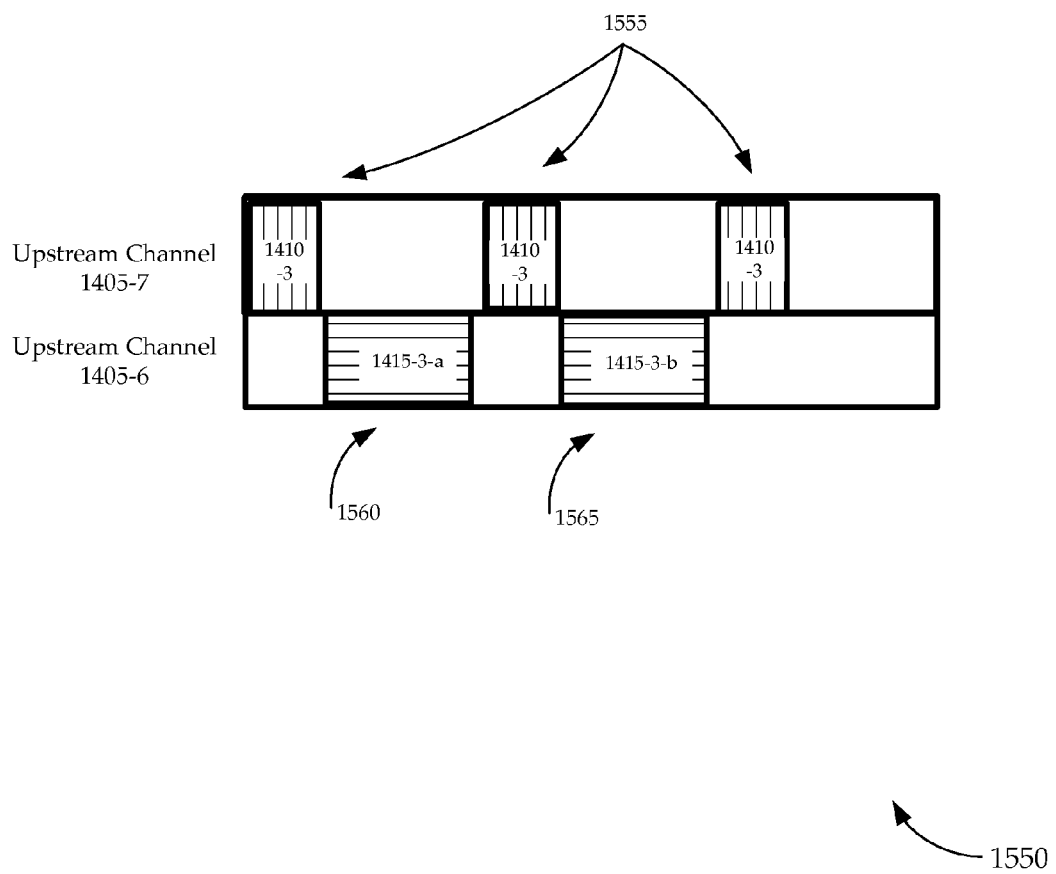
FIG. 15B is block diagram illustrating an upstream channel assignment according to various embodiments of the invention.

Turning to FIG. 15B, a diagram 1550 illustrates a set of upstream frequency channels 1405, allocated as described with reference to FIG. 14A. Assume that subscriber terminal 130-*b* in FIG. 15A is allocated time slots 1410-3 in upstream channel 1405-7, and times slots 1415-3 in upstream channel 1405-6. This allocation may be received by the upstream mapping unit 1510 of subscriber terminal 130-*b*. In one embodiment, the allocation is a block of time slots unassigned to particular streams, allowing the subscriber terminal 130-*b* to determine or otherwise control traffic assignment dynamically. The allocation may be the frame composition message produced by the upstream resource allocation unit 1310 transmitted to the subscriber terminal 130-*b*.

The upstream mapping unit 1510 may then identify and classify at least some of the data traffic to be transmitted in a time period as prioritized subscriber terminal traffic. The classification may be based, in whole or in part, on a determination as to whether transmission specifications include limitations on latency and packet spacing variance that exceed a threshold level. This threshold level may be the same, or different, than the threshold applied by an upstream traffic classification unit 1305 at the gateway 115-*c* transmitting the allocation. The upstream mapping unit 1510 may then dynamically assign the prioritized subscriber terminal traffic 1555 to the allocation in a set of time slots 1410-3. This assignment may be made because the assigned slots conform with the limitations on latency and/or packet spacing variance. The upstream mapping unit 1510 may subsequently assign the non-prioritized data traffic 1560 a first time slot 1415-3-*a* remaining in the allocation. With no additional traffic to transmit in the period, the remaining time slot 1415-3-*c* may go unassigned 1565.

Figure 16A:
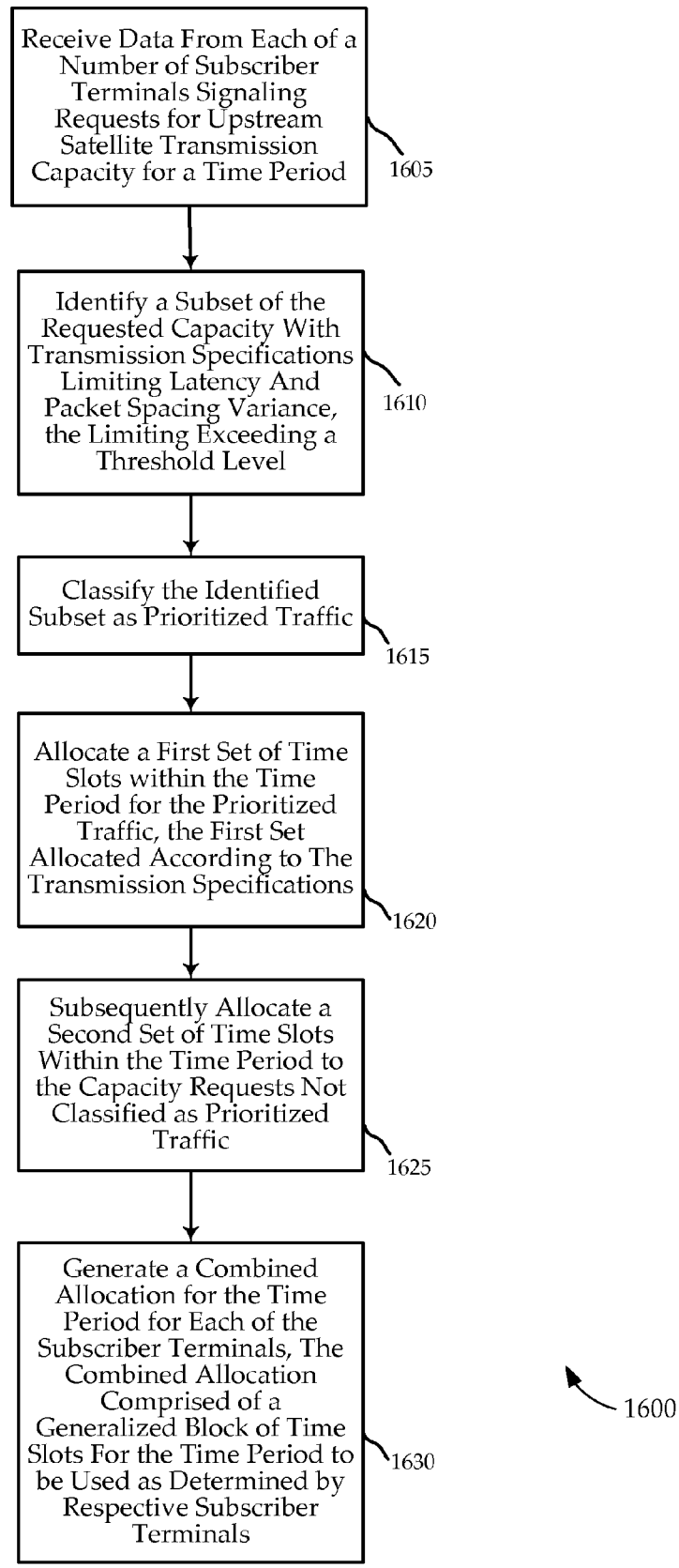
FIG. 16A is a flow diagram illustrating the allocation of time slots for prioritized traffic according to various embodiments of the invention.

Referring next to FIG. 16A, a flowchart is shown illustrating a method 1600 for allocating time slots to prioritized traffic on wireless upstream signals. The method may be performed, for example, in whole or in part, by the gateway 115 described with reference to FIG. 1, 2, 4, or 13.

At block 1605, data is received from each of a number of subscriber terminals signaling requests for upstream satellite transmission capacity for a time period. At block 1610, a subset of the requested capacity is identified with transmission specifications limiting latency and packet spacing variance, the limitations exceeding a threshold level. At block 1615, the identified subset is classified as prioritized traffic.

At block 1620, a first set of time slots in the time period is allocated for the prioritized traffic, the first set allocated according to the transmission specifications. At block 1625, a second set of time slots in the time period is subsequently allocated to the capacity requests not classified as prioritized traffic. At block 1630, a combined allocation for the time period is generated for each of the subscriber terminals, the combined allocation comprised of a generalized block of time slots for the time period to be used as determined by respective subscriber terminals.

Figure 16B:
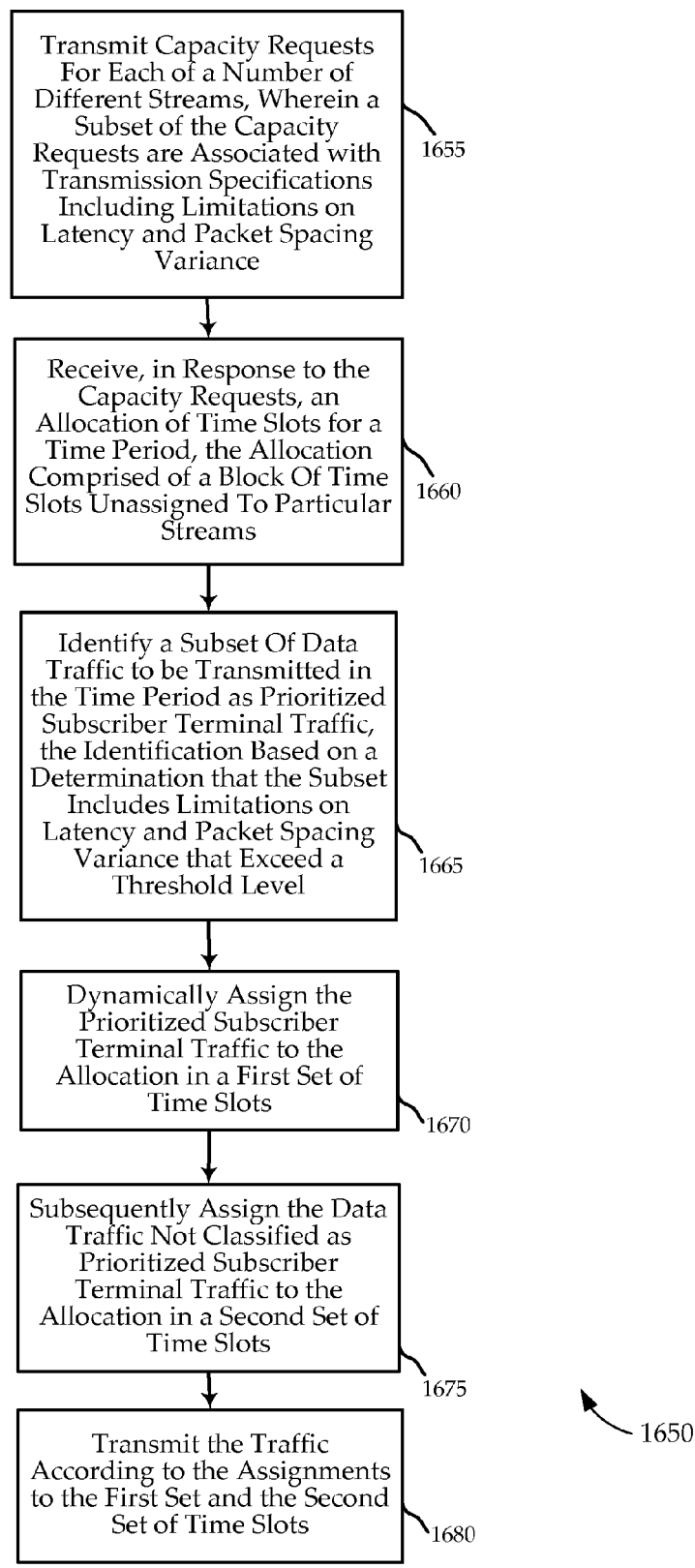
FIG. 16B is a flow diagram illustrating the assignment of traffic across time slot allocations according to various embodiments of the invention.

Referring next to FIG. 16B, a flowchart is shown illustrating a method 1650 of assigning traffic on wireless upstream signals. The method may be performed, for example, in whole or in part, by the subscriber terminal 130 described with reference to FIG. 1, 6, or 15A.

At block 1655, capacity requests are transmitted for each of a number of different streams, wherein at least a subset of the capacity requests are associated with transmission specifications including limitations on latency and packet spacing variance. At block 1660, an allocation of time slots for a time period is received in response to the capacity requests, the allocation comprised of a block of time slots unassigned to particular streams. This allocation may be the generalized block of time slots generated at block 1630 of FIG. 16A, transmitted from a gateway 115 to a subscriber terminal 130.

At block 1665, a subset of data traffic to be transmitted in the time period is identified as prioritized subscriber terminal traffic, the identification based on a determination that the subset includes limitations on latency and packet spacing variance that exceed a threshold level. At block 1670, the prioritized subscriber terminal traffic is dynamically assigned to the allocation in a first set of time slots. At block 1675, the data traffic not classified as prioritized subscriber terminal traffic is subsequently assigned to the allocation in a second set of time slots. At block 1680, the traffic is transmitted according to the assignments in the first set and the second set of time slots.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A device for generation of wireless upstream signals for satellite communications, the device comprising:
    an analog frequency synthesizer configured to tune an output signal to a frequency within an upstream satellite communications frequency range;
    a digitally controlled oscillator, communicatively coupled with the analog frequency synthesizer, and configured to vary the output signal among a set of carrier frequencies within a subset of the upstream satellite communications frequency range;
    a receiver configured to receive data mapping the wireless upstream signals to different ones of the set of carrier frequencies in a series of time slots, the mapping limited to carrier frequencies within the subset of the frequency range; and
    a processor, communicatively coupled with the digitally controlled oscillator and the receiver, and configured to control the digitally controlled oscillator to cause the output signal to hop between carrier frequencies according to the received data.

2. The device of claim 1, wherein the processor is further configured to:
    determine the set of carrier frequencies, the set comprising carrier frequencies to which the digitally controlled oscillator unit is capable of transition during an available transition time.

3. The device of claim 1, wherein the processor is further configured to:
    generate a set of data for transmission, the set of data identifying carrier frequencies to which the digitally controlled oscillator unit is capable of transition during a predetermined transition time.

4. The device of claim 1, wherein the processor is further configured to:
    identify the different ones of the set of carrier frequencies based at least in part on a determination of settling time for transitions between the different ones.

5. The device of claim 1, wherein the processor is further configured to generate data for transmission identifying current bandwidth requirements and associated traffic types for the device.

6. The device of claim 1, wherein the processor is further configured to generate data for transmission estimating future bandwidth requirements and associated traffic types.

7. The device of claim 1, wherein,
the subset of the frequency range is allocated for upstream satellite communication for a subset of a plurality of subscriber terminals transmitting upstream in the frequency range, the subset of subscriber terminals associated with a selected sub-channel identifier of a plurality of sub-channel identifiers.

8. The device of claim 1, wherein,
each one of the set of carrier frequencies corresponds to a frequency channel allocated for use in upstream satellite communications; and
the frequency channels comprise frequency channels in a multi-frequency time-division multiple access system.

9. The device of claim 1, wherein set of carrier frequencies comprise a plurality of adjacent frequency channels.

10. A method of generating wireless upstream signals for satellite communications, the method comprising:
receiving data including a mapping of time slots to different ones of a set of carrier frequencies within a subset of an upstream satellite communications frequency range allocated for the wireless upstream signals;
tuning an output signal to a frequency within the subset of the frequency range; and
varying the output signal to hop among the different ones of the set of carrier frequencies according to the received mapping data, the variance limited to carrier frequencies within a digitally controlled oscillator range to which the output signal is capable of transitioning from the tuned frequency during transitional periods.

11. The method of claim 10, further comprising:
determining the set of carrier frequencies during an available transition time.

12. The method of claim 10, further comprising:
identifying the different ones of the set of carrier frequencies based at least in part on a determination of settling time for transitions between the different ones.

13. The method of claim 10, further comprising:
generating data for transmission identifying current bandwidth requirements and associated traffic types for a device transmitting the wireless upstream signals.

14. The method of claim 10, further comprising:
generating data for transmission estimating future bandwidth requirements and associated traffic types.

15. A device for allocating time slots on a plurality of frequency channels for upstream satellite communications to a plurality of respective user terminals, the device comprising:
a monitor configured to:
monitor a traffic load on the plurality of frequency channels; and
determine that the traffic load on a first frequency channel of the plurality of frequency channels exceeds a first threshold capacity;
a scheduler, communicatively coupled with the monitor, and configured to:
identify a first user terminal of the plurality of respective user terminals, the first user terminal transmitting upstream on the first frequency channel;
select a second frequency channel of the plurality of frequency channels, the second frequency channel selected at least in part because the first user terminal is configured with a digitally controlled oscillator capable of transitioning between the first frequency channel and the second frequency channel;
allocate a first plurality of time slots in the first frequency channel to the first user terminal; and
allocate a second plurality of time slots in the second frequency channel to the first user terminal, the second of plurality of time slots different from the first plurality of time slots and allocated so as to allow the first user terminal to hop between the first frequency channel and the second frequency channel for respective time slot allocations; and
a transmitter, communicatively coupled with the scheduler, and configured to transmit data directed at the first user terminal, the data comprising the first plurality of time slots and the second plurality of time slots.

16. The device of claim 15, further comprising:
a receiver, communicatively coupled with the monitor, and configured to receive data from the plurality of respective user terminals each transmitting on the first frequency channel requesting future upstream bandwidth,
wherein the monitor is further configured to use the received data in the determination of whether the traffic load on the first frequency channel exceeds the first threshold capacity, the traffic load comprising a future traffic load.

17. The device of claim 15, further comprising:
a receiver, communicatively coupled with the monitor, and configured to receive data from the first user terminal transmitting on the first frequency channel and requesting additional upstream bandwidth,
wherein the additional upstream bandwidth causes the traffic load on the first frequency channel to exceed the first threshold capacity.

18. The device of claim 15, further comprising:
a receiver, communicatively coupled with the monitor, and configured to receive data from the first user terminal identifying a subset of the plurality of frequency channels, the identified subset comprising two or more frequency channels the digitally controlled oscillator is capable of transitioning to from the first frequency channel.

19. The device of claim 15, wherein the threshold capacity is less than a total capacity for the first frequency channel.

20. The device of claim 15, wherein the scheduler is configured to select the second frequency channel because the second frequency channel includes a time slot that can be transitioned to coherently from the first frequency channel.

21. The device of claim 15, wherein the scheduler is configured to select the second frequency channel because the frequency channel is a closest channel from the first frequency channel.

22. The device of claim 15, wherein the scheduler is configured to select the second frequency channel because the frequency channel is an available channel with more available capacity than other available channels.

23. The device of claim 15, wherein the scheduler is configured to select the second frequency channel responsive to a settling time associated with transition between the first frequency channel and the second frequency channel.

24. The device of claim 15, wherein the scheduler is further configured to:
identify a subset of the plurality of frequency channels, the subset comprising two or more frequency channels the digitally controlled oscillator is capable of transitioning to from the first frequency channel.

25. The device of claim 15, wherein the scheduler is further configured to:
  assign a first subset of the plurality of frequency channels for exclusive use among a first subset of the plurality of respective user terminals; and
  assign a second subset of the plurality of frequency channels for exclusive use among a second subset of the plurality of respective user terminals.

26. The device of claim 25, wherein the transmitter is further configured to:
  transmit a first downstream packet with a first sub-channel identifier in a physical layer header, the first sub-channel identifier used to differentiate packets destined for the first subset of the plurality of respective user terminals; and
  transmit a second downstream packet with a second sub-channel identifier in a physical layer header, the second sub-channel identifier used to differentiate packets destined for the second subset of the plurality of respective user terminals.

27. The device of claim 25, wherein each of the first subset of frequency channels is adjacent to at least one other frequency channel of the first subset of frequency channels, and each of the second subset of frequency channels is adjacent to at least one other frequency channel of the second subset of frequency channels.

28. The device of claim 15, wherein the plurality of frequency channels comprise a plurality of adjacent frequency channels.

29. A method of allocating time slots on a plurality of frequency channels for upstream satellite communications, the method comprising:
  determining that a traffic load on a first frequency channel of the plurality of frequency channels exceeds a first threshold capacity;
  identifying a user terminal transmitting upstream on the first frequency channel;
  selecting a second frequency channel of the plurality of frequency channels, the second frequency channel selected at least in part because the user terminal is configured with a digitally controlled oscillator configured to transition between the first frequency channel and the second frequency channel;
  allocating a first plurality of time slots in the first frequency channel to the user terminal; and
  allocating a second plurality of time slots in the second frequency channel to the user terminal, the second plurality of time slots different from the first plurality of time slots,
  wherein the first and the second pluralities of time slots are allocated to allow the user terminal to hop between the first frequency channel and the second frequency channel for respective time slot allocations.

30. The method of claim 29, further comprising:
  receiving data from a plurality of user terminals some of which transmit on the first frequency channel and request future upstream bandwidth; and
  using the received data in the determination that the traffic load on the first frequency channel exceeds the first threshold capacity, the traffic load comprising a future traffic load.

31. The method of claim 29, further comprising:
  receiving data from the user terminal transmitting on the first frequency channel and requesting additional upstream bandwidth, wherein the received data causes the traffic load on the first frequency channel to exceed the first threshold capacity.

32. The method of claim 29, further comprising:
  selecting the second frequency channel based at least in part on the second frequency channel having more available capacity than other available frequency channels.

33. A system for allocating time slots in frequency channels for upstream satellite communications, the system comprising:
  a gateway configured to:
    monitor a traffic load on the plurality of frequency channels;
    determine that the traffic load on a first frequency channel of the plurality of frequency channels exceeds a first threshold capacity; and
    select a second frequency channel of the plurality of frequency channels, the second frequency channel selected at least in part because a user terminal using the first frequency channel is configured with a digitally controlled oscillator to transition between the first frequency channel and the second frequency channel;
    allocate a first plurality of time slots in the first frequency channel to the user terminal;
    allocate a second plurality of time slots in the second frequency channel to the user terminal, the second plurality of time slots different from the first plurality of time slots and allocated so as to allow the user terminal to hop between the first frequency channel and the second frequency channel for respective time slot allocations; and
    transmit mapping data including the first plurality of time slots and the second plurality of time slots directed at the user terminal via a satellite;
  the satellite, in wireless communication with the gateway device and the user terminal, and configured to receive the transmitted data and retransmit the received data to the user terminal; and
  the user terminal configured to:
    receive the retransmitted data; and
    hop between the first frequency channel and the second frequency channel according to the received mapping data.

34. The system of claim 33, wherein the subscriber terminal is configured to:
  determine a set of carrier frequencies to which the digitally controlled oscillator unit is capable of transition, each carrier frequency of the set corresponding to a selected one of the adjacent frequency channels; and
  transmit data comprising the determined set of carrier frequencies to the gateway device.

35. A device for generation of wireless upstream signals for satellite communications, the device comprising:
  means for analog tuning an output signal to a frequency within an upstream satellite communications frequency range;
  means for varying, using a digitally controlled oscillator, the output signal among a set of carrier frequencies within a subset of the upstream satellite communications frequency range;
  means for receiving data mapping the wireless upstream signals to different ones of the set of carrier frequencies in a series of time slots, the mapping limited to carrier frequencies within the subset of the frequency range; and
  means for controlling the digitally controlled oscillator to cause the output signal to hop between carrier frequencies according to the received data.

36. A device for allocating time slots on a plurality of frequency channels for upstream satellite communications, the device comprising:

means for determining that a traffic load on a first frequency channel of a plurality of adjacent frequency channels exceeds a first threshold capacity;

means for identifying a user terminal transmitting upstream on the first frequency channel;

means for selecting a second frequency channel of the plurality of adjacent frequency channels, the second frequency channel selected because the user terminal is configured with a digitally controlled oscillator configured to transition between the first frequency channel and the second frequency channel;

means for allocating a first plurality of time slots in the first frequency channel to the user terminal; and means for allocating a second plurality of time slots in the second frequency channel to the user terminal, the second plurality of time slots different from the first plurality of time slots, wherein the first and the second pluralities of time slots are allocated to allow the user terminal to hop between the first frequency channel and the second frequency channel for respective time slot allocations.

\* \* \* \* \*